US012645092B2

(12) United States Patent
Yonemoto et al.

(10) Patent No.: US 12,645,092 B2
(45) Date of Patent: Jun. 2, 2026

(54) BEAM COMBINER, METHOD OF FORMING ALIGNMENT FILM, AND METHOD OF MANUFACTURING OPTICAL ELEMENT

(71) Applicant: FUJIFILM Corporation, Tokyo (JP)

(72) Inventors: Takashi Yonemoto, Minamiashigara (JP); Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 301 days.

(21) Appl. No.: 18/477,697

(22) Filed: Sep. 29, 2023

(65) Prior Publication Data

US 2024/0027783 A1 Jan. 25, 2024

Related U.S. Application Data

(63) Continuation of application No. PCT/JP2022/016539, filed on Mar. 31, 2022.

(30) Foreign Application Priority Data

Mar. 31, 2021 (JP) ................................ 2021-061290
Dec. 3, 2021 (JP) ................................ 2021-197073

(51) Int. Cl.
*G02B 27/28* (2006.01)
*G02B 1/08* (2006.01)
*G02B 5/30* (2006.01)

(52) U.S. Cl.
CPC ............ *G02B 27/283* (2013.01); *G02B 1/08* (2013.01); *G02B 5/3016* (2013.01)

(58) Field of Classification Search
None
See application file for complete search history.

(56) References Cited

U.S. PATENT DOCUMENTS

2005/0062916 A1 3/2005 Matsumoto et al.
2014/0368771 A1 12/2014 Sakai et al.
(Continued)

FOREIGN PATENT DOCUMENTS

JP 2002-116321 A 4/2002
JP 2004-354936 A 12/2004
(Continued)

OTHER PUBLICATIONS

International Preliminary Report on Patentability (Form PCT/IPEA/409) for International Application No. PCT/JP2022/016539, dated May 2, 2023, with an English translation.
(Continued)

*Primary Examiner* — Ryan Crockett
(74) *Attorney, Agent, or Firm* — Birch, Stewart, Kolasch & Birch, LLP

(57) ABSTRACT

Provided are a beam combiner that can obtain a fine and clear interference pattern, a method of forming an alignment film in which a fine and clear alignment pattern can be obtained, and a method of manufacturing an optical element including a fine and clear liquid crystal alignment pattern. The beam combiner includes: a beam combiner element that emits light where light transmitted through a first surface and light reflected from a second surface are combined; a light control element that is provided on an upstream side of the beam combiner; and a polarization conversion layer that converts polarized light of the light emitted from the beam combiner element, in which an absolute value of an ellipticity of light emitted from the polarization conversion layer is 0.7 or more.

16 Claims, 14 Drawing Sheets

(56) References Cited

U.S. PATENT DOCUMENTS

| | | | | |
|---|---|---|---|---|
| 2019/0041316 | A1 * | 2/2019 | Tanabe | G01N 21/01 |
| 2019/0353957 | A1 * | 11/2019 | Atsumi | G02F 1/133634 |
| 2021/0033765 | A1 * | 2/2021 | Sato | G02B 27/425 |
| 2022/0268983 | A1 * | 8/2022 | Sakakura | G02B 5/3083 |
| 2022/0276499 | A1 * | 9/2022 | Wang | G02B 5/1814 |
| 2024/0329418 | A1 * | 10/2024 | Iijima | G02B 27/0172 |

FOREIGN PATENT DOCUMENTS

| | | | |
|---|---|---|---|
| JP | 2008-262662 | A | 10/2008 |
| WO | WO 2013/111867 | A1 | 8/2013 |
| WO | WO 2017/138655 | A1 | 8/2017 |
| WO | WO 2018/164126 | A1 | 9/2018 |
| WO | WO 2019/203357 | A1 | 10/2019 |

OTHER PUBLICATIONS

International Search Report (Form PCT/ISA/210) for International Application No. PCT/JP2022/016539, dated May 31, 2022, with an English translation.

Kim et al., "Fabrication of ideal geometric-phase holograms with arbitrary wavefronts," Optica, vol. 2, No. 11, 2015, pp. 958-964.

Japanese Office Action for corresponding Japanese Application No. 2023-511708, dated Feb. 17, 2026, with English translation.

* cited by examiner

BEAM COMBINER, METHOD OF FORMING ALIGNMENT FILM, AND METHOD OF MANUFACTURING OPTICAL ELEMENT

CROSS-REFERENCE TO RELATED APPLICATIONS

This application is a Continuation of PCT International Application No. PCT/JP2022/016539 filed on Mar. 31, 2022, which claims priority under 35 U.S.C. § 119(a) to Japanese Patent Application No. 2021-061290 filed on Mar. 31, 2021 and Japanese Patent Application No. 2021-197073 filed on Dec. 3, 2021. The above applications are hereby expressly incorporated by reference, in their entirety, into the present application.

BACKGROUND OF THE INVENTION

1. Field of the Invention

The present invention relates to a beam combiner that generates interference light, a method of forming an alignment film using the beam combiner, and a method of manufacturing an optical element using the alignment film.

2. Description of the Related Art

A beam combiner that causes two beams to interfere with each other to form an interference pattern is known.

For example, "Fabrication of ideal geometric-phase holograms with arbitrary wavefronts", Optica Vol. 2, No. 11, November 2015, pp. 958-964 describes a beam combiner shown in FIG. 17.

This beam combiner 100 includes: a light source 102; a polarization beam splitter 104 that splits light M having coherence emitted from the light source 102; a mirror 106*a* that is disposed on an optical path of a part of the light split by the polarization beam splitter 104; a mirror 106*b* that is disposed on an optical path of the remaining part of the light split by the polarization beam splitter 104; a light control element 108; a half mirror 110; and a λ/4 plate 112.

In the beam combiner 100, the light M having coherence emitted from the light source 102 is split into P polarized light MP and S polarized light MS by the polarization beam splitter 104.

The S polarized light MS split by the polarization beam splitter 104 is reflected from the mirror 106*a*, transmits through the light control element 108, and is incident into the half mirror 110 (half mirror). On the other hand, the P polarized light MP split by the polarization beam splitter 104 is reflected from the mirror 106*b* and is incident into the half mirror 110.

The P polarized light MP is reflected from the half mirror 110. On the other hand, the S polarized light MS transmitted through the light control element 108 transmits through the half mirror 110. As a result, the P polarized light MP and the S polarized light MS are combined with each other by the half mirror 110 to interfere with each other.

The P polarized light MP and the S polarized light MS are converted into right circularly polarized light and left circularly polarized light by the λ/4 plate 112 depending on polarization directions, and are incident into, for example, a photosensitive material Z to form an interference pattern. For example, in a case where the photosensitive material Z includes a coating film that includes a compound having a photo-aligned group, an alignment film having an alignment pattern corresponding to the interference pattern is obtained.

The beam combiner 100 can form various interference patterns depending on the light control element 108.

For example, in a case where a convex lens is used as the light control element 108, for example, as conceptually shown in FIG. 2, an interference pattern including a pattern where a straight line changes while continuously rotating in one direction in a radial shape from an inner side toward an outer side is formed.

SUMMARY OF THE INVENTION

In the beam combiner 100 described in "Fabrication of ideal geometric-phase holograms with arbitrary wavefronts", Optica Vol. 2, No. 11, November 2015, pp. 958-964, as an angle at which light modulated by the light control element 108 is incident with respect to the normal line of the photosensitive material Z increases, that is, as an angle at which the light is incident into the photosensitive material Z increases, a fine interference pattern is obtained.

For example, in a case where the light control element 108 is a convex lens, by setting the focal point of the light control element 108 to be short to significantly expand the diameter of the light emitted from the half mirror 110, the light is incident into the photosensitive material Z at a wide angle, and a fine interference pattern is obtained.

Incidentally, according to an investigation by the present inventors, in the beam combiner in the related art, for example, the beam combiner 100 described in "Fabrication of ideal geometric-phase holograms with arbitrary wavefronts", Optica Vol. 2, No. 11, November 2015, pp. 958-964, in a case where a fine interference pattern is formed, there is a problem in that the interference pattern is unclear.

An object of the present invention is to solve the above-described problem of the related art and to provide a beam combiner that can obtain a fine and clear interference pattern, a method of forming an alignment film using the beam combiner, and a method of manufacturing an optical element using the alignment film formed using the method of forming an alignment film.

In order to achieve the object, the present invention has the following configurations.

[1] A beam combiner comprising:

a beam combiner element that includes a first surface through which at least a part of incidence light transmits and a second surface from which at least a part of the incidence light is reflected and emits light where the light transmitted through the first surface and the light reflected from the second surface are combined;

at least one light control element that focuses or diffuses light and is provided on at least one of an optical path of first light incident into the first surface of the beam combiner element or an optical path of second light incident into the second surface of the beam combiner element; and at least one polarization conversion layer that converts polarized light of the light emitted from the beam combiner element, wherein in a case where first linearly polarized light is incident into the first surface of the beam combiner element and light is not incident into the second surface of the beam combiner element, an absolute value of an ellipticity of light emitted from the polarization conversion layer is 0.7 or more, and in a case where second linearly polarized light orthogonal to the first linearly polarized light is incident into the second surface of the beam combiner element and light is not incident into the first surface of the beam combiner element, an absolute value of an ellipticity of light emitted from the polarization conversion layer is 0.7 or more and a sign of the ellipticity is opposite to that of the light during the incidence of the first linearly polarized light.

[2] The beam combiner according to [1],
in which in a case where parallel light is incident into the light control element, at least a part of the light emitted from the beam combiner element has an angle of 15° or more with respect to an optical axis.

[3] The beam combiner according to [1] or [2],
in which a wavelength of the first light and the second light is λ nm,
the polarization conversion layer is a laminated wave plate that includes two A-Plates having different axial angles, and
an absolute value of an angle between slow axes of the two A-Plates is 45°.

[4] The beam combiner according to any one of [1] to [3],
in which a wavelength of the first light and the second light is λ nm,
the polarization conversion layer is a laminated wave plate that includes two A-Plates having different axial angles, and
both retardations of the two A-Plates are 0.24λ to 0.26λ.

[5] The beam combiner according to any one of [1] to [4],
in which a wavelength of the first light and the second light is λ nm, and
in a case where light having the wavelength λ nm is incident obliquely at 15°, a retardation of the polarization conversion layer is 0.24λ to 0.26λ.

[6] The beam combiner according to any one of [1] to [5],
in which in the first surface of the beam combiner element, a transmittance with respect to P polarized light having a wavelength λ nm is 70% or more in a case where an angle with respect to an optical axis of the first light in a plane orthogonal to the first surface and parallel to an incidence direction of the second light into the beam combiner element is in a range of −20° to 20°.

[7] A method of forming an alignment film comprising:
irradiating a coating film including a compound having a photo-aligned group with light emitted from the beam combiner according to any one of [1] to [6].

[8] A method of manufacturing an optical element comprising:
a step of applying a composition including a liquid crystal compound to the alignment film formed using the method of forming an alignment film according to [7] and drying the applied composition.

With the beam combiner according to an aspect of the present invention, a fine and clear interference pattern can be formed. In addition, in the method of forming an alignment film according to an aspect of the present invention, an alignment film having a fine and clear alignment pattern can be formed. Further, in the method of manufacturing an optical element according to an aspect of the present invention, an optical element having a fine and clear liquid crystal alignment pattern can be manufactured.

DESCRIPTION OF THE PREFERRED EMBODIMENTS

Hereinafter, a beam combiner, a method of forming an alignment film, and a method of manufacturing an optical element according to the present invention will be described in detail based on preferable embodiments shown in the accompanying drawings.

The following description regarding components has been made based on a representative embodiment of the present invention. However, the present invention is not limited to the embodiment.

Further, all the drawings described below are conceptual views for describing the present invention. A size, a thickness, a positional relationship, and the like of each of members, portions, and the like do not necessarily match with the actual ones.

In the present specification, numerical ranges represented by "to" include numerical values before and after "to" as lower limit values and upper limit values.

Figure 1:
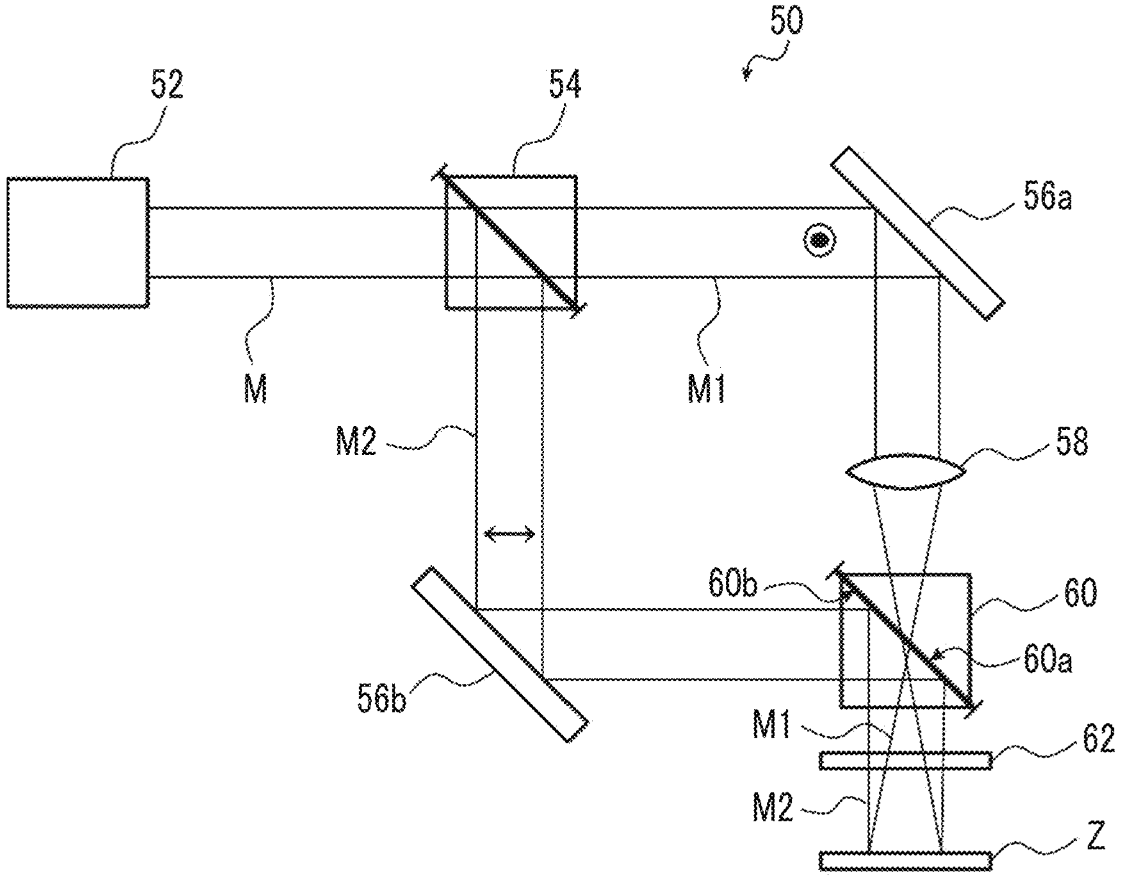
FIG. 1 is a diagram conceptually showing an example of a beam combiner according to the present invention.

FIG. 1 conceptually shows an example of a beam combiner according to an embodiment of the present invention.

A beam combiner 50 shown in FIG. 1 includes a light source 52, a beam splitter 54, mirrors 56*a* and 56*b*, a light control element 58, a beam combiner element 60, and a polarization conversion layer 62.

In the beam combiner 50, light M having coherence emitted from the light source 52 is split into linearly polarized light components orthogonal to each other by the beam splitter 54, one of the linearly polarized light components is modulated by the light control element 58, the two linearly polarized light components are combined by the beam combiner element 60, and the combined light is converted into circularly polarized light by the polarization conversion layer 62.

In the beam combiner 50, by causing two circularly polarized light components having opposite turning directions to interfere with each other and to be incident into a photosensitive material Z, an interference fringe is formed, and the photosensitive material Z is exposed to the interference fringe to form an interference pattern on the photosensitive material Z.

In the beam combiner 50, as the light source 52, a well-known light source can be used as long as light emitted from the light source has coherence. In particular, as the light source having excellent coherence, a laser light source is suitably used.

The light M having coherence emitted from the light source 52 is incident into the beam splitter 54.

The beam splitter 54 splits the light M having coherence into first light M1 and second light M2 as linearly polarized light components orthogonal to each other. For example, the beam splitter 54 splits the incident light M having coherence into the first light M1 as S polarized light and the second light M2 as P polarized light.

The first light M1 is the first light in the present invention, and the second light M2 is the second light in the present invention.

As the beam splitter 54, various well-known polarization beam splitters such as a cube type or a plate type can be used as long as they can split the light M having coherence into linearly polarized light components orthogonal to each other.

In addition, as the beam splitter 54, a combination of an optical element such as a half mirror or a non-polarization beam splitter that splits the light M having coherence and at least one polarizer can also be used. Light components split by the half mirror, the non-polarization beam splitter, or the like are not linearly polarized light components orthogonal to each other. However, by using the half mirror, the non-polarization beam splitter, or the like in combination with the polarizer, linearly polarized light components orthogonal to each other can be obtained. Here, the polarizer is not particularly limited, and various well-known polarizers, for example, a reflective polarizer such as a wire grid polarizer, an absorptive polarizer having dichroism, or a polarization prism such as a Glan-Thompson prism can be suitably used.

The first light M1 is reflected from the mirror 56*a*, is modulated by the light control element 58, and is incident into the beam combiner element 60. In the example shown in the drawing, the light control element 58 is, for example, a convex lens. Accordingly, light transmitted through the light control element 58 is focused such that the diameter expands in and after the focal point. The light control element 58 will be described below.

On the other hand, the second light M2 is reflected from the mirror 56*b* and is incident into the beam combiner element 60.

The beam combiner element 60 includes: a beam combiner element that includes a first surface 60*a* through which at least a part of incidence light transmits; and a second surface 60*b* from which at least a part of the incidence light is reflected. The light incident into and transmitted through the first surface 60*a* of the beam combiner element 60 and the light incident into and reflected from the second surface 60*b* of the beam combiner element 60 are combined and emitted from the beam combiner element 60.

In the following description, in order to simplify the sentences, "at least a part" in the description "at least a part of incidence light transmits", "at least a part of the incidence light is reflected", and the like is omitted.

In the beam combiner 50 in the example shown in the drawing, the first light M1 that transmits through the light control element 58 and is focused is incident into and transmits through the first surface 60*a* of the beam combiner element 60, and the second light M2 is incident into and reflected from the second surface 60*b*.

The first light M1 incident into and transmitted through the first surface 60*a* and the second light M2 incident into and reflected from the second surface 60*b* are combined as shown in FIG. 1. As described above, the first light M1 and the second light M2 are originally split from the same light M having coherence. Accordingly, the first light M1 and the second light M2 that are combined interfere with each other.

The beam combiner element 60 is not limited, and any well-known elements can be used as long as they include the first surface 60*a* through which incidence light transmits and the second surface 60*b* from which the incidence light is reflected and can combine the light incident into and transmitted through the first surface 60*a* and the light reflected from the second surface 60*b*.

As the beam combiner element 60, for example, a well-known beam splitter such as a cube type or a plate type, a half mirror, and the like can be used.

The beam combiner element 60 may be a polarization beam combiner (polarization beam splitter) or may be a non-polarization beam combiner (non-polarization beam splitter).

The polarization beam combiner refers to a combiner where only specific polarized light, for example, S polarized light transmits through and the other polarized light is reflected from the first surface 60*a* (transmission surface) and only specific polarized light, for example, P polarized light is reflected from and the other polarized light transmits through the second surface 60*b* (reflecting surface).

On the other hand, the non-polarization beam combiner refers to a combiner where light components are combined such that an intensity ratio between transmitted light and reflected light that are emitted is a specific ratio irrespective of polarization.

It is preferable that the beam splitter has properties of allowing the transmission of the first light M1 without converting the polarization state and allowing the reflection of the second light M2 without converting the polarization state.

Since the first light M1 that transmits through the light control element 58 and is focused is incident into the first surface 60*a* of the beam combiner element 60, it is preferable that the first surface 60*a* also has high transmittance with respect to incidence light at a wide angle.

With the above-described configuration, a fine but clearer interference pattern can be obtained, and the interference pattern can be formed in a wider region. This point will be described below.

Next, the first light M1 and the second light M2 that are combined by the beam combiner element 60 are converted into circularly polarized light components by the polarization conversion layer 62.

As described above, the first light M1 and the second light M2 are linearly polarized light components orthogonal to each other. Accordingly, by the polarization conversion layer 62, the first light M1 is converted into right circularly polarized light, and the second light M2 is converted into left circularly polarized light. Alternatively, by the polarization conversion layer 62, the first light M1 is converted into left circularly polarized light, and the second light M2 is converted into right circularly polarized light.

Preferable examples of the polarization conversion layer 62 include a so-called ¼ wave plate (¼ retardation plate, λ/4 plate) that has an in-plane retardation (retardation Re) of about ¼ wavelength at the wavelength of the incidence light, that is, the first light M1 and the second light M2.

As the ¼ wave plate, for example, a ¼ wave plate where a ratio between the retardation and the wavelength is 0.24 to 0.26 in the plane direction is preferable, and a ¼ wave plate where the ratio is 0.245 to 0.255 is more preferable.

The polarization conversion layer 62 may be used in combination with a plurality of optical elements. In this case, in the form where the plurality of optical elements are combined, the retardation measured using a method described below may be about the ¼ wavelength.

Here, in the beam combiner 50 according to the embodiment of the present invention, in a case where the wavelength of the incidence light, that is, the first light M1 and the second light M2 is λ nm, it is preferable that, in a case where the light is incident obliquely at an angle of 15° with respect to the optical axis, the in-plane retardation of the polarization conversion layer 62 is 0.24λ to 0.26λ.

This point will be described below.

As described above, in the beam combiner 50, by causing two circularly polarized light components having opposite turning directions to interfere with each other and to be incident into a photosensitive material Z, an interference fringe is formed, and the photosensitive material Z is exposed to the interference fringe to form an interference pattern on the photosensitive material Z.

In the beam combiner 50, the interference pattern to be formed changes depending on the light control element 58. In other words, by selecting the light control element 58 to be used, the interference pattern to be formed can be selected.

As described above, in the beam combiner 50 in the example shown in the drawing, the light control element 58 is, for example, a convex lens.

Figure 2:
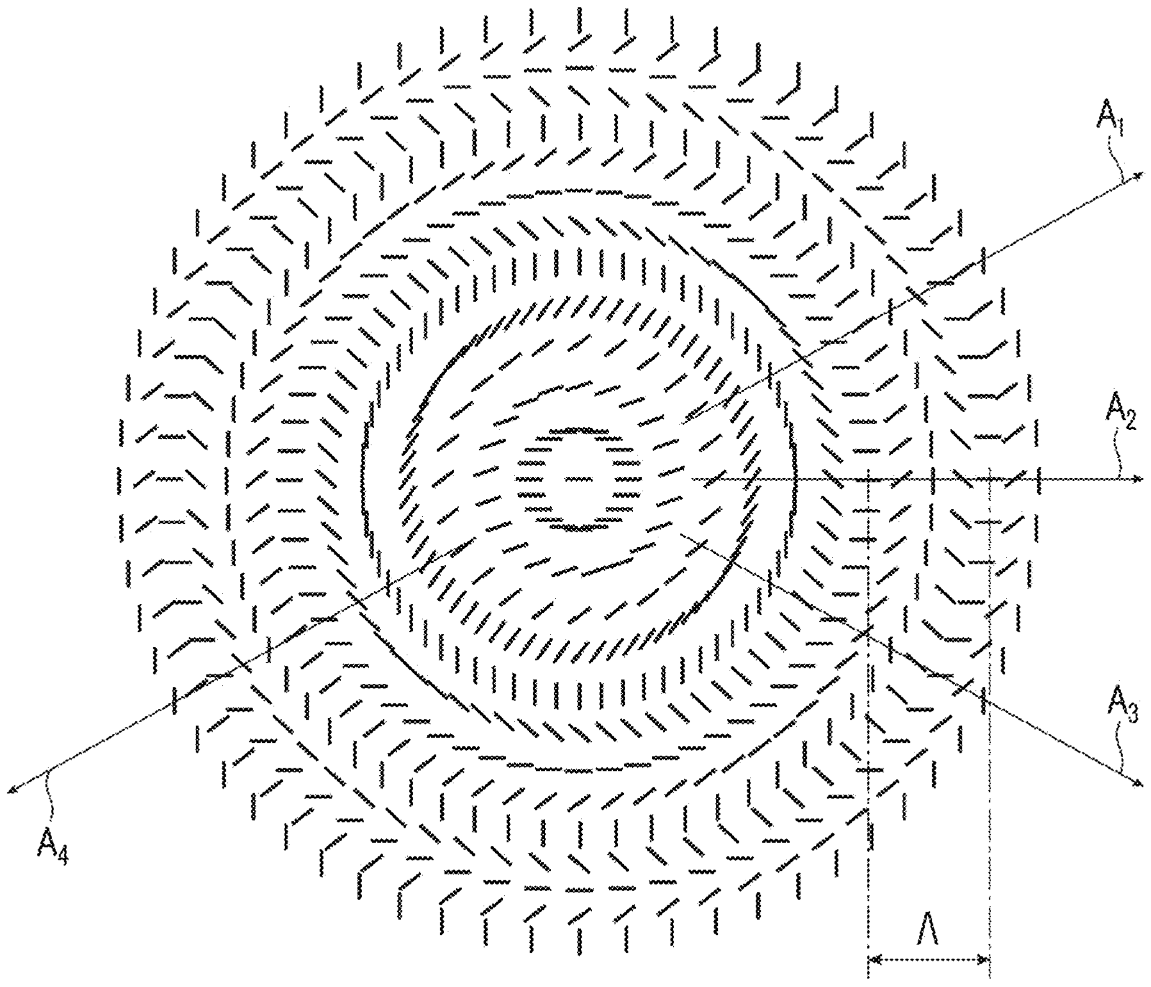
FIG. 2 is a diagram conceptually showing an example of an interference pattern formed by the beam combiner according to the present invention.

In a case where the light control element 58 is a convex lens, as conceptually shown in FIG. 2, the interference pattern that is formed on the photosensitive material Z by the beam combiner 50 includes a pattern where a short straight line changes while continuously rotating in one direction in a radial shape as indicated by an arrow in the drawing. In other words, in a case where the light control element 58 is a convex lens, the interference pattern that is formed on the photosensitive material Z by the beam combiner 50 is a concentric circular interference pattern that includes one direction in which a short straight line changes while continuously rotating in a concentric circular shape from an inner side toward an outer side as shown in FIG. 2.

In the beam combiner 50, due to the interference between right circularly polarized light and left circularly polarized light, the polarization state of light to be irradiated on the photosensitive material Z periodically changes according to the interference fringe.

Here, as shown in FIG. 1, the first light M1 is focused by the light control element 58 (convex lens) and is diffused in and after the focal point. As a result, an intersecting angle between the right circularly polarized light and the left circularly polarized light changes from the inner side to the outer side of the concentric circle. As a result, an interference pattern where the period decreases from the inner side toward the outer side is obtained. Thus, in the photosensitive material Z, the interference pattern having a radial shape (concentric circular shape) where the interference pattern periodically changes is obtained.

Specifically, in the interference pattern, a short straight line changes while continuously rotating in a plurality of directions from the center toward the outer side, for example, a direction indicated by an arrow $A_1$, a direction indicated by an arrow $A_2$, a direction indicated by an arrow $A_3$, a direction indicated by an arrow $A_4$, or . . . . In the following description, the short straight line of which the direction changes while continuously rotating will be referred to as "short line" for convenience of description.

The rotation direction of the short line is the same direction in all of the directions (one direction). In the example shown in the drawing, in all the directions including the direction indicated by the arrow $A_1$, the direction indicated by the arrow $A_2$, the direction indicated by the arrow $A_3$, and the direction indicated by the arrow $A_4$, the rotation direction of the short line is counterclockwise.

That is, in a case where the arrow $A_1$ and the arrow $A_4$ are assumed as one straight line, the rotation direction of the short line is reversed at the center on the straight line. For example, the straight line formed by the arrow $A_1$ and the arrow $A_4$ is directed in the right direction (arrow $A_1$ direction) in the drawing. In this case, the short line initially rotates clockwise from the outer side to the center, the rotation direction is reversed at the center, and then the short line rotates counterclockwise from the center to the outer side.

The rotation direction of the short line is not limited to the direction shown in FIG. 2 and may be opposite to the rotation direction shown in FIG. 2.

In addition, in the interference pattern, in a case where a length over which the direction of the short line rotates by 180° in the one direction in which the direction of the short line changes while continuously rotating is set as a single period Λ, the length of the single period Λ gradually decreases from the inner side toward the outer side. The single period Λ will be described below.

In the beam combiner according to the embodiment of the present invention, the light control element 58 is not limited to a convex lens, and various optical elements can be used.

As the light control element 58, not only a spherical lens called a convex lens and a concave lens but also an aspherical lens can be suitably used.

For example, by using a lens array in which a plurality of lenses are arranged in a plane as the light control element 58, an interference pattern where a plurality of concentric circles are arranged can be formed.

An object to be irradiated, for example, the photosensitive material Z may be disposed outside or inside the focal point of the light control element 58.

By disposing the object to be irradiated outside the focal point of the light control element 58, a space where the beam combiner element 60, the polarization conversion layer 62, and the like are disposed can be secured between the light control element 58 and the object to be irradiated. In addition, by disposing the object to be irradiated inside the focal point of the light control element 58, the beam combiner 50 can be minimized.

In addition, for example, in order to suppress aberration and to improve the degree of freedom of the interference pattern, the light control element 58 may be configured by combining a plurality of optical elements.

For example, a convex lens that focuses light and a concave lens that diffuses light may be combined to configure the light control element 58 that focuses light as in a convex lens as a whole.

In addition, the light control element 58 may be a relay optical system where a plurality of lenses are disposed according to the respective focal lengths. By configuring the light control element 58 as the relay optical system, a space where a large optical element is disposed can be secured.

In the beam combiner 50 in the example shown in the drawing, the light control element 58 is disposed on only the optical path of the first light M1 that transmits through the first surface 60*a* of the beam combiner element 60. However, the present invention is not limited to this example.

That is, the light control element 58 may be disposed on only the optical path of the second light M2 that is reflected from the second surface 60*b* of the beam combiner element 60, or may be disposed on both of the optical path of the first light M1 and the optical path of the second light M2. Note that, in a case where the light control element 58 is disposed on both of the optical path of the first light M1 and the optical path of the second light M2, the light control element 58 disposed on the optical path of the first light M1 is different from that disposed the optical path of the second light M2.

In this case, for example, a pattern is formed by interference of two spherical waves, and thus the degree of freedom of the interference pattern can be improved.

In addition, the disposition position of the light control element 58 is not limited to the upstream of the beam combiner element 60, and various positions can be used. In this case, a plurality of light control elements 58 may be disposed.

For example, in a state where the light control element 58 is disposed on at least one of the optical path of the first light M1 or the optical path of the second light M2, the light control element 58 may be further disposed between the beam combiner element 60 and the polarization conversion layer 62.

In the present invention, the upstream and the downstream refer to the upstream and the downstream in a light traveling direction from the light source 52 to the photosensitive material Z.

Incidentally, the first light M1 is focused by the light control element 58 (convex lens) and is diffused in and after the focal point. That is, a part of the first light M1 emitted from the beam combiner element 60 has an angle with respect to the optical axis.

In a case where the angle of the first light M1 is large, the interference pattern formed on the photosensitive material Z is fine. Specifically, in a case where a direction perpendicular to a main surface of the photosensitive material Z, that is, the normal direction is set to 0°, as the angle at which the first light M1 is incident into the photosensitive material Z increases, a fine interference pattern can be obtained. That is, as the angle at which the first light M1 is incident into the photosensitive material Z is wider, a fine interference pattern is formed on the photosensitive material Z.

For example, as shown in FIG. 2, in the pattern where the short line changes while continuously rotating in the one direction, as the angle at which the first light M1 is incident into the photosensitive material Z is wider, the length of the single period Λ over which the short line rotates by 180° in the one direction (the direction of the arrow) decreases.

The main surface is the maximum surface of a sheet-shaped material (a film or a layer).

Figure 17:
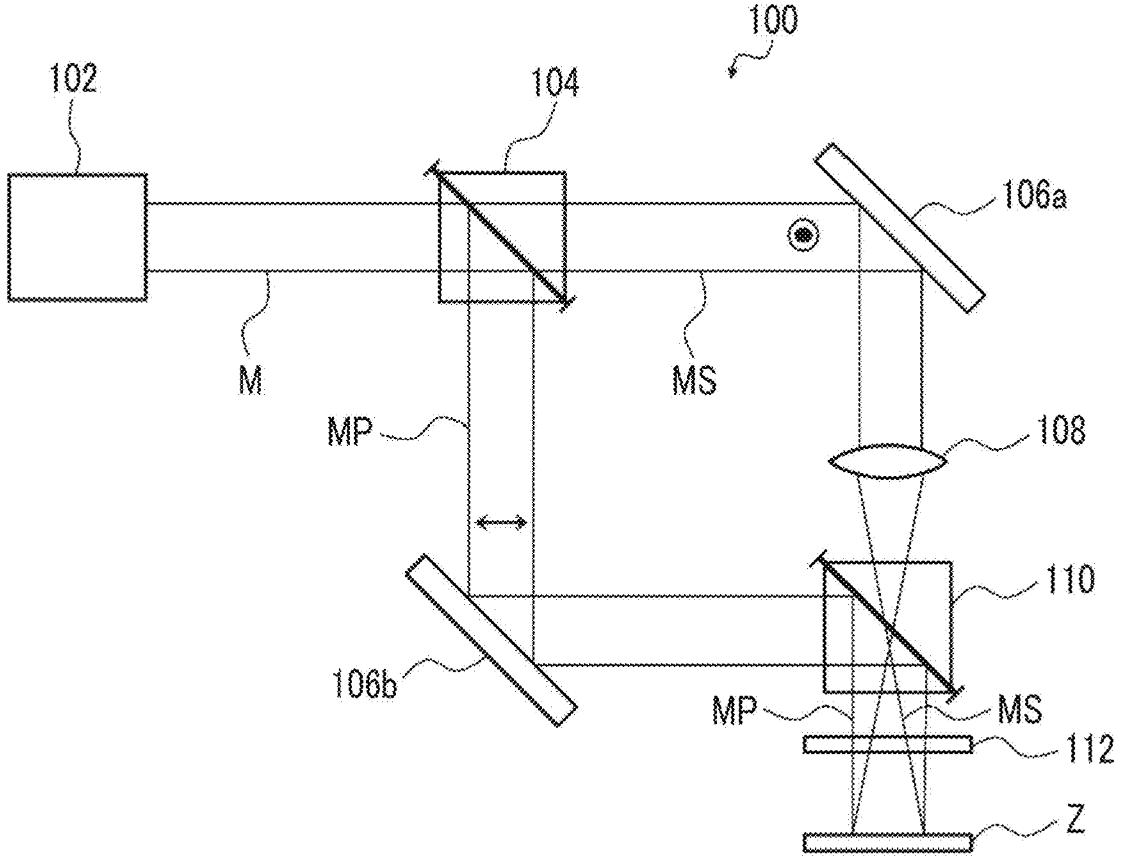
FIG. 17 is a diagram conceptually showing an example of a beam combiner in the related art.

In the beam combiner in the related art disclosed in "Fabrication of ideal geometric-phase holograms with arbitrary wavefronts", Optica Vol. 2, No. 11, November 2015, pp. 958-964 shown in FIG. 17, in a case where a fine interference pattern is formed, there is a problem in that the interference pattern is unclear. In particular, a fine interference pattern where the single period Λ is 1.2 μm or less is unclear.

The present inventor repeated an investigation on this point. As a result, it was found that, in the beam combiner in the related art, the reason why the interference pattern is unclear is that the conversion of polarization by the ¼ wave plate is insufficient.

As described above, in the beam combiner, as the angle at which light is incident into the photosensitive material Z is wider, a fine interference pattern can be formed on the photosensitive material Z.

Incidentally, the angle at which the light transmits through the light control element and is incident into the photosensitive material Z being wider represents that light is also incident obliquely into the ¼ wave plate. In addition, as the angle at which light is incident into the photosensitive material Z increases, the angle at which light is incident obliquely into the ¼ wave plate also increases.

Therefore, in the light transmitted through the light control element, the conversion of polarization by the ¼ wave plate is insufficient, and the polarized light is elliptically polarized light instead of circularly polarized light. As a result, in the beam combiner in the related art, an interference pattern obtained by the interference between circularly polarized light components is unclear.

On the other hand, in the beam combiner 50 according to the embodiment of the present invention, in a case where the first light M1 is incident and the second light M2 is not incident into the beam combiner element 60, an absolute value of an ellipticity of the first light M1 transmitted through the polarization conversion layer 62 is 0.7 or more, and in a case where the second light M2 is incident and the first light M1 is not incident into the beam combiner element 60, an absolute value of an ellipticity of the second light M2 transmitted through the polarization conversion layer 62 is 0.7 or more.

As described above, the first light M1 and the second light M2 are linearly polarized light components orthogonal to each other. In addition, the first light M1 is incident into the first surface 60*a* of the beam combiner element 60 through incidence light transmits, and the second light M2 is incident into the second surface 60*b* of the beam combiner element 60 from which the incidence light is reflected. As described above, the first light M1 is the first light in the present invention, and the second light M2 is the second light in the present invention.

Further, the first light M1 and the second light M2 are linearly polarized light components orthogonal to each other. By the polarization conversion layer 62, one light component is converted into right circularly polarized light, the remaining light component is converted into left circularly polarized light, and the light components are converted into circularly polarized light components having opposite turning directions. Accordingly, regarding the sign of the ellipticity of the light transmitted through the polarization conversion layer 62, the signs of the first light M1 and the second light M2 are opposite to each other.

The beam combiner 50 according to the embodiment of the present invention has the above-described configuration. As a result, appropriate circularly polarized light components can be caused to interfere with each other on the downstream side of the polarization conversion layer 62.

Thus, with the beam combiner 50 according to the embodiment of the present invention, a fine and clear interference pattern can be formed on the photosensitive material Z.

As a method of adjusting both of the absolute value of the ellipticity of the first light M1 transmitted through the polarization conversion layer 62 in a case where only the first light M1 is incident into the beam combiner element 60 and the absolute value of the ellipticity of the second light M2 transmitted through the polarization conversion layer 62 in a case where only the second light M2 is incident into the beam combiner element 60 to be 0.7 or more, various methods can be used.

For example, in a case where the wavelength of the incidence light, that is, the first light M1 and the second light M2 is λ nm, a method of using the polarization conversion layer 62 where the in-plane retardation is 0.24λ to 0.26λ in a case where the light is incident obliquely at an angle of 15° with respect to the optical axis can be used.

As the polarization conversion layer 62 having the above-described retardation, a laminated wave plate formed of a plurality of layers is suitably used.

Examples of the laminated wave plate include those described in WO2013/137464A, WO2016/158300A, JP2014-209219A, JP2014-209220A, WO2014/157079A, JP2019-215416A, and WO2019/160044A. Note that, in the present invention, the laminated wave plate is not limited to these examples.

In the present invention, in particular, from the viewpoint of controlling the retardation with respect to the oblique incidence described below, the polarization conversion layer 62 that is a laminated wave plate formed of an A-Plate and a positive C-plate is suitably used. In addition, in order to impart a compensation function described below, it is also preferable that the laminated wave plate has a multilayer configuration that include three or more layers, and it is more preferable that the laminated wave plate has a multilayer configuration that include three or more layers including at least an A-Plate and a positive C-plate.

In addition, from the viewpoint of imparting the compensation function described below, preferable examples of the polarization conversion layer 62 include a laminated wave plate where at least two A-Plates having different axial angles are laminated. In addition, preferable examples of the polarization conversion layer 62 including the two A-Plates include a laminated wave plate where at least two A-Plates having different axial angles and a C-plate are laminated.

In the polarization conversion layer 62, as described above, it is preferable that the total retardation of the optical elements (layers) forming the polarization conversion layer is about ¼ wavelength.

In the present invention, the A-plate, a B-plate, and the C-plate are defined as follows.

There are two kinds of A-plates: a positive A-plate (positive A-plate, +A-plate) and a negative A-plate (negative A-plate, −A-plate). In a case where a refractive index in an in-plane slow axis direction of the film is represented by nx, a refractive index in a direction orthogonal to the in-plane slow axis in a plane is represented by ny, a refractive index in a thickness direction is represented by nz, the positive A-plate satisfies a relationship represented by Expression (A1), and the negative A-plate satisfies a relationship represented by Expression (A2). Rth of the positive A-plate has a positive value, and Rth of the negative A-Plate has a negative value. That is, the in-plane slow axis direction of the film is a direction in which the in-plane refractive index is the maximum.

$$nx>ny\approx nz \qquad \text{Expression (A1):}$$

$$ny<nx\approx nz \qquad \text{Expression (A2):}$$

"≈" described above represents not only a case where both elements are the same but also a case where both elements are substantially the same. Regarding the meaning of "substantially the same", "ny≈nz" includes a case where (ny−nz)×d is −10 to 10 nm and preferably −5 to 5 nm, and "nx≈nz" includes a case where (nx−nz)×d is −10 to 10 nm and preferably −5 to 5 nm. In (ny−nz)×d, d represents the thickness of the film.

All values of nx, ny, and nz of the B-plate are different and there are two kinds of B-plates; a B-plate having a negative Rth value satisfying the relationship of Expression (B1) and a B-plate having a positive Rth value satisfying the relationship of Expression (B2).

$$(nx+ny)/2>nz \qquad \text{Expression (B1):}$$

$$(nx+ny)/2<nz \qquad \text{Expression (B2):}$$

There are two kinds of C-plates: a positive C-plate (positive C-plate, +C-plate) and a negative C-plate (negative C-plate, −C-plate). The positive C-plate satisfies a relationship represented by Expression (C1), and the negative C-plate satisfies a relationship represented by Expression (C2). Rth of the positive C-plate has a negative value, and Rth of the negative C-Plate has a positive value.

$$nz>nx\approx ny \qquad \text{Expression (C1):}$$

$$nz<nx\approx ny \qquad \text{Expression (C2):}$$

"≈" described above represents not only a case where both elements are the same but also a case where both elements are substantially the same. Regarding the meaning of "substantially the same", "nx≈ny" includes a case where (nx−ny)×d is 0 to 10 nm and preferably 0 to 5 nm. In (ny−nz)×d, d represents the thickness of the film.

In the light transmitted through the beam combiner element 60, the polarization direction changes depending on the deflection direction (the direction of the deflection axis) in the surface orthogonal to the optical axis. The light transmitted through the beam combiner element 60 is the first light M1 in the example shown in the drawing.

The degree of the change in polarization direction varies depending on the polarization direction during the incidence into the beam combiner element 60, that is, the azimuthal angle of the polarization direction. In particular, in the vertical direction, the change is significant. The vertical direction is a direction perpendicular to the paper plane in FIG. 1 and is the direction of S polarized light in the example shown in the drawing.

It is preferable that the polarization conversion layer 62 has a function of compensating for the change in polarization direction by the beam combiner element 60.

As an example of the polarization conversion layer 62 having the function of compensating for the change in polarization direction, a laminated wave plate where two A-Plates having different axial angles and a C-plate are laminated is suitably used. The axial angle of the A-Plate on the incidence side is preferably 0° or 90°, and the axial angle of the remaining A-Plate is preferably 45° or 135°.

As another example of the polarization conversion layer 62 having the function of compensating for the change in polarization direction, a laminated wave plate where two A-Plates having different axial angles is also suitably used. In this case, the two A-Plates forming the laminated wave plate only need to have different axial angles, and an absolute value of an angle between slow axes thereof is preferably 45°. Further, in both of the two A-Plates forming the laminated wave plate, the in-plane retardation is preferably 0.24λ to 0.26λ in a case where the wavelength of the first light M1 and the second light M2 is λ nm. That is, in each of the two A-Plates, the retardation is preferably about ¼ wavelength.

The axial angle (slow axis angle) refers to the angle of the slow axis of the polarization conversion layer 62, is 0° in a case where the axial angle is parallel to S polarized light, and is 90° in a case where the axial angle is parallel to P polarized light.

In the polarization conversion layer 62, it is preferable that an antireflection layer is provided on at least one surface, and it is more preferable that an antireflection layer is provided on both surfaces.

It is preferable that the antireflection layer also has a high antireflection function with respect to incidence light at a wide angle.

A reflectivity of P polarized light and S polarized light at the wavelength λ nm in a case where an incidence angle of the antireflection layer (polarization conversion layer 62) is in a range of −20° to 20° is preferably 1% or less, more preferably 0.5% or less, and still more preferably 0.2% or less.

The polarization conversion layer 62 has the antireflection function such that stray light generated by surface reflection can be prevented from being irradiated to the photosensitive material Z and forming an undesired interference pattern.

As the antireflection layer, a well-known antireflection film such as a moth eye film or an antireflection film where a layer of low refractive index and a layer of high refractive index are alternately laminated can be used.

The antireflection layer may be formed directly on the surface of the polarization conversion layer 62, or in a state where the antireflection layer is formed on an optically transparent substrate such as glass or a resin film having a small birefringence, the polarization conversion layer and a substrate may be bonded to each other.

From the viewpoint of smoothness, it is preferable that the antireflection layer is formed on a glass substrate and is bonded to the polarization conversion layer 62. In addition, in this case, as the glass substrate, it is more preferable to use quartz glass.

In addition to the polarization conversion layer 62, the antireflection layer may be optionally provided on at least one of a light incident surface or a light emission surface of at least one element forming the beam combiner, for example, the beam splitter 54, the mirrors **56*a* and 56*b*, the light control element 58, or the beam combiner element 60**.

As described above, in the beam combiner 50, as the angle at which the first light M1 transmits through the light control element 58 and is incident into the photosensitive material Z is wider, a fine interference pattern can be formed.

In the beam combiner 50 according to the embodiment of the present invention, an angle at which light transmits through the light control element 58 and is emitted from the beam combiner element 60 with respect to the optical axis of the light is not limited.

Here, regarding the light transmitted through the light control element 58, it is preferable that, in a case where parallel light is incident into the light control element 58, at least a part of the light emitted from the beam combiner element 60 has an angle of 15° or more with respect to an optical axis. The light transmitted through the light control element 58 is the first light M1 in the example shown in the drawing.

The angle of the light emitted from the beam combiner element 60 with respect to the optical axis is more preferably 17° or more and still more preferably 20° or more.

With the configuration in which at least a part of the light emitted from the beam combiner element 60 has an angle of 15° or more with respect to the optical axis, a fine interference pattern can be formed. In particular, in a case where the light that cannot transmit through the light control element 58 is parallel light, a fine interference pattern can be suitably formed. The light that cannot transmit through the light control element 58 is the second light M2 in the example shown in the drawing.

In the first light M1 or the second light M2 incident into the photosensitive material Z at an angle, it is preferable that a projection component to the photosensitive material Z is similar to circularly polarized light. In other words, in a case where a surface perpendicular to the optical axis is observed, the configuration where the projection component is similar to circularly polarized light is not necessarily suitable for the formation of a fine interference pattern.

In the present invention, it is preferable that the polarization conversion layer 62 has the compensation function in consideration of an effective polarization change by projection.

Figure 3:
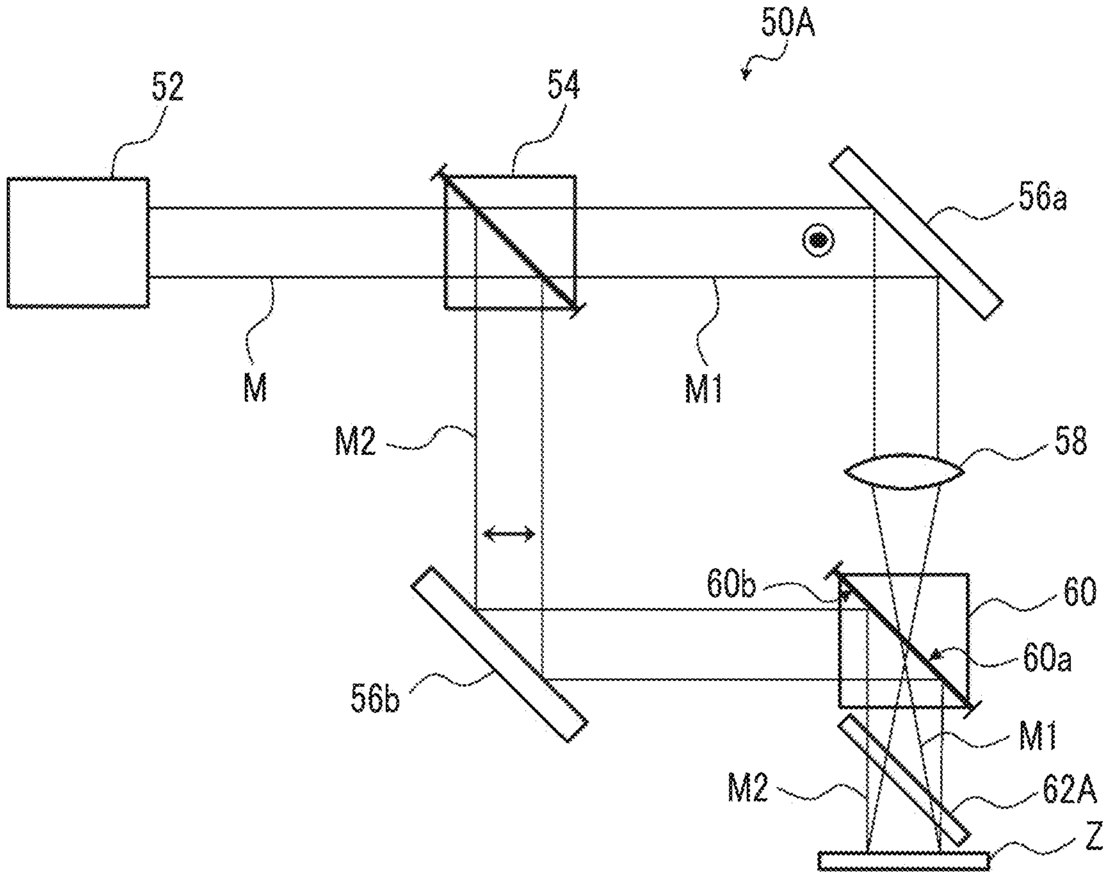
FIG. 3 is a diagram conceptually showing another example of the beam combiner according to the present invention.

FIG. 3 illustrates an example of another aspect of the beam combiner according to the embodiment of the present invention.

In the beam combiner 50 shown in FIG. 1, the polarization conversion layer 62 is disposed orthogonal to the optical axis of the first light M1 and the second light M2 that are combined.

On the other hand, in a beam combiner 50A shown in FIG. 3, a polarization conversion layer 62A is parallel to a reflecting surface of the beam combiner element 60, that is, the second surface **60*b***.

As described above, the second light M2 reflected from the second surface **60*b* of the beam combiner element 60** is, for example, P polarized light.

Here, in a case where the second light M2 is reflected from the second surface **60*b* of the beam combiner element 60, the polarization direction may deviate such that the second light M2 is not completely P polarized light. In this case, in a case where the polarization conversion layer is orthogonal to the optical axis of the second light M2, as described above, the conversion by the polarization conversion layer is insufficient such that the second light M2** is elliptically polarized light. As a result, in a case where a fine interference pattern is formed, the interference pattern is unclear as described above.

On the other hand, as in the beam combiner 50A shown in FIG. 3, the polarization conversion layer 62A is parallel to the second surface **60*b* of the beam combiner element 60. As a result, the polarization direction of the second light M2** that deviates during the reflection from the second surface 60*b* of the beam combiner element 60 can be compensated for.

As a result, the second light M2 can be converted into appropriate circularly polarized light by the polarization conversion layer 62A, and a fine and clear interference pattern can be formed.

As the polarization conversion layer 62A, various layers can be used as in the above-described polarization conversion layer 62.

In addition, in the beam combiner 50A shown in FIG. 3, as the polarization conversion layer 62A, a layer consisting of an A-Plate that acts as a ¼ wave plate without including a C-plate or the like is suitably used.

Here, the polarization conversion layer 62A may be substantially parallel to the reflecting surface of the beam combiner element 60, that is, the second surface 60*b*. For example, the polarization conversion layer 62A may be parallel to the second surface 60*b* of the beam combiner element 60 at an angle obtained by adding a physical angle and an optical angle.

In the polarization conversion layer 62A that acts as a ¼ wave plate, in general, the slow axis is parallel to the main surface. Accordingly, in this case, the polarization conversion layer 62A may be disposed parallel to the second surface 60*b* of the beam combiner element 60.

In the examples shown in FIGS. 1 and 3, the polarization conversion layer 62A may be a retardation layer having an optical axis that is tilted with respect to the main surface of the polarization conversion layer, that is, a so-called O-plate.

For example, the second surface 60*b* (reflecting surface) of the beam combiner element 60 is tilted by 45° with respect to the optical axis of the second light M2. In this case, in a case where the slow axis of the polarization conversion layer 62A is tilted by 25° with respect to the main surface, the polarization conversion layer 62A may be disposed to be tilted by 20° with respect to the optical axis of the second light M2. As a result, the second surface 60*b* of the beam combiner element 60 having an angle of 45° with respect to the optical axis and the polarization conversion layer 62A can be made parallel to each other physically and optically (20°+25°=45°).

In all of the beam combiners shown in FIGS. 1 and 3, S polarized light is incident into the first surface 60*a* of the beam combiner element 60, and P polarized light is incident into the second surface 60*b* of the beam combiner element 60. However, the beam combiner according to the embodiment of the present invention is not limited to this configuration.

Figure 13:
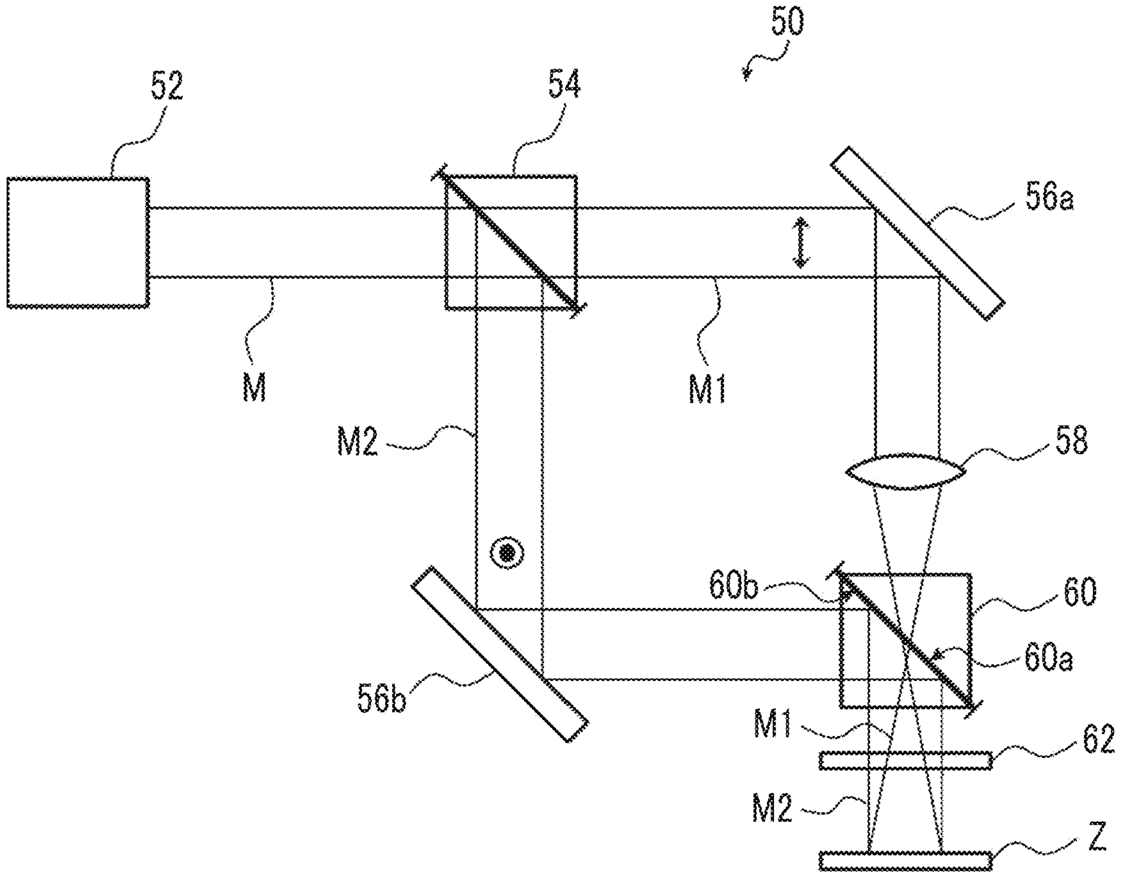
FIG. 13 is a diagram conceptually showing another example of the beam combiner according to the present invention.

That is, in the beam combiner according to the embodiment of the present invention, as conceptually shown in FIG. 13, P polarized light as the first light M1 may be incident into the first surface 60*a* of the beam combiner element 60 and S polarized light as the second light M2 may be incident into the second surface 60*b* of the beam combiner element 60 such that the P polarized light as the transmitted light and the S polarized light as the reflected light are combined with each other.

Here, as described above, since the first light M1 that transmits through the light control element 58 and is focused is incident into the first surface 60*a* of the beam combiner element 60, it is preferable that the first surface 60*a* also has high transmittance with respect to incidence light at a wide angle.

In particular, in a case where the light incident into and transmitted through the first surface 60*a* is P polarized light, by increasing the transmittance of the first surface 60*a*, a fine but clearer interference pattern can be obtained, and the appropriate interference pattern can be formed in a wide region.

Figure 14:
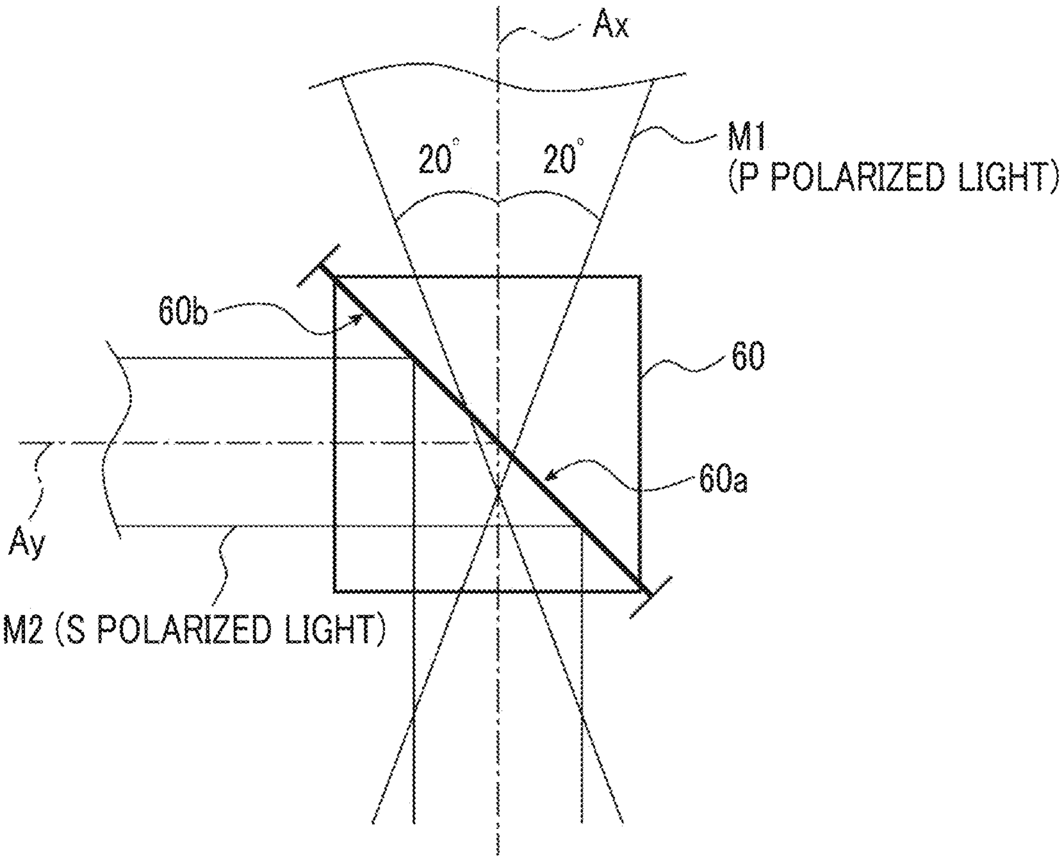
FIG. 14 is a conceptual diagram showing the beam combiner shown in FIG. 13.

Specifically, in a case where the first light M1 is P polarized light, as conceptually shown in FIG. 14, a transmittance of the first surface 60*a* of the beam combiner element 60 with respect to P polarized light having a wavelength λ nm of the first light M1 is preferably 70% or more and more preferably 80% or more in a case where an angle with respect to an optical axis Ax of the first light M1 in a plane orthogonal to the first surface 60*a* and parallel to an incidence direction of the second light M2 into the beam combiner element 60 is in a range of −20° to 20°.

The optical axis Ax of the first light M1 matches with the optical axis of the light source 52. In addition, it is preferable that the optical axis Ax of the first light M1 matches with the optical axis of the light control element 58 (convex lens).

Specifically, in a case where the first light M1 is P polarized light, a transmittance of the first surface 60*a* of the beam combiner element 60 with respect to S polarized light having the wavelength λ nm of the first light M1 is preferably less than 5% and more preferably less than 2% in a case where the angle with respect to the optical axis Ax of the first light M1 in the plane orthogonal to the first surface 60*a* and parallel to the incidence direction of the second light M2 into the beam combiner element 60 is in a range of −5° to 5° (refer to FIG. 14). Further, a transmittance of the second surface 60*b* of the beam combiner element 60 with respect to S polarized light having the wavelength λ nm of the second light M2 is also preferably 50% or more in a case where an angle with respect to an optical axis Ay of the second light M2 in the same plane is in a range of −20° to 20°. As a result, on the second surface 60*b* of the beam combiner element 60, a high reflectivity with respect to S polarized light of parallel light can be obtained.

A material for forming the polarization conversion layer 62 used in the present invention is not particularly limited.

Accordingly, the polarization conversion layer 62 may be, for example, a layer formed of a composition including a liquid crystal compound or a layer formed of a polymer film. The polymer film is a film formed of a polymer (resin) and is preferably a stretched polymer film.

Examples of the polymer film include a polycarbonate film, a cycloolefin polymer film, a TAC film, and a polyimide film.

The cycloolefin polymer film is more preferable from the viewpoint of obtaining excellent light fastness and withstanding long-term use.

In a case where the polarization conversion layer 62 used in the present invention is a laminated wave plate consisting of a plurality of layers, the layers in the laminated wave plate may be formed of independently different materials.

It is preferable that the polarization conversion layer 62 used in the present invention is a layer that is formed of a composition including a liquid crystal compound. By forming the polarization conversion layer 62 using the composition including a liquid crystal compound, the thickness of the polarization conversion layer can be reduced, and optical characteristics can be easily adjusted.

The composition including a liquid crystal compound is preferably a composition including a polymerizable liquid crystal compound. The layer formed of the composition including a polymerizable liquid crystal compound is preferably a layer formed by immobilizing the polymerizable liquid crystal compound by polymerization or the like.

The type of the liquid crystal compound is not particularly limited.

The liquid crystal compound can be classified into a rod-like liquid crystal (rod-like liquid crystal compound) and a disk-like liquid crystal (disk-like liquid crystal compound, discotic liquid crystal (compound) by the shape thereof. Further, each of the liquid crystal compounds can also be classified into a low molecular weight type and a high molecular weight type. In general, the polymer refers to a compound having a polymerization degree of 100 or higher (Polymer Physics-Phase Transition Dynamics, Masao Doi, page 2, Iwanami Shoten Publishers, 1992). In the present invention, any liquid crystal compound can also be used.

In addition, in the liquid crystal composition, two or more rod-like liquid crystals, two or more disk-like liquid crystals, or a mixture of a rod-like liquid crystal and a disk-like liquid crystal may be used.

Further, as the rod-like liquid crystal, for example, liquid crystals described in claim 1 of JP1999-513019A (JP-H11-513019A) and paragraphs "0026" to "0098" of JP2005-289980A can be preferably used. On the other hand, as the disk-like liquid crystal, for example, liquid crystals described in paragraphs "0020" to "0067" of JP2007-108732A and paragraphs "0013" to "0108" of JP2010-244038A can be preferably used.

In the beam combiner 50 shown in FIG. 1 (FIGS. 3 and 13), the light M emitted from the light source 52 is directly incident into the beam splitter 54, but the present invention is not limited thereto. That is, the beam combiner according to the embodiment of the present invention may include various optical members for adjusting the light M emitted from the light source 52.

Figure 15:
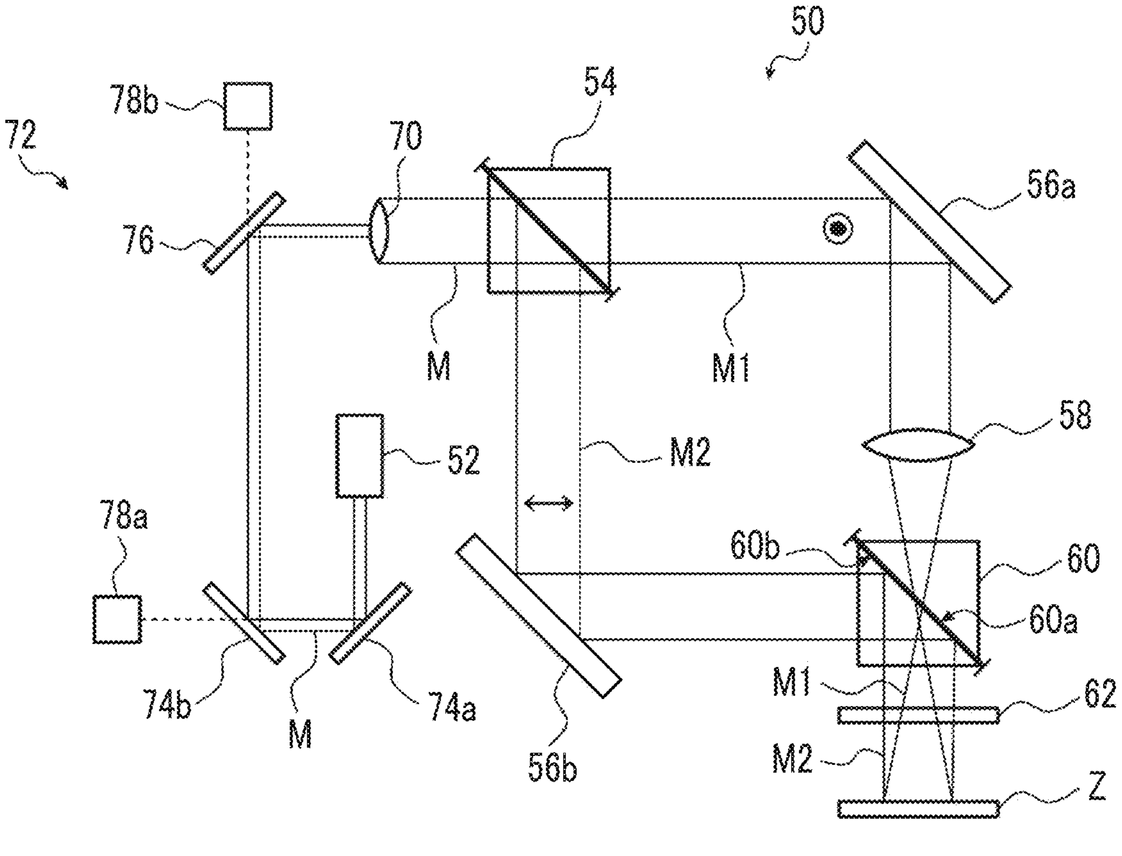
FIG. 15 is a diagram conceptually showing another example of the beam combiner according to the present invention.

FIG. 15 illustrates an example of the beam combiner.

In the example shown in FIG. 15, as a preferable aspect, a beam expander element 70 and an optical path adjustment optical system 72 are provided between the light source 52 and the beam splitter 54.

In the beam combiner according to the embodiment of the present invention, both of the beam expander element 70 and the optical path adjustment optical system 72 provided as the preferable aspect are not necessarily provided, and only either one thereof may be provided. However, in the present invention, it is more preferable that both of the beam expander element 70 and the optical path adjustment optical system 72 are provided.

The beam expander element 70 expands the diameter of the light M (light beam) emitted from the light source 52 (beam expansion element).

The beam combiner includes the beam expander element 70 such that the area of an exposed region in the photosensitive material Z increases, and this configuration can also suitably deal with manufacturing of a large diffraction element (liquid crystal diffractive lens) or the like).

The beam expander element 70 is not limited, and various beam expanders such as a transmissive expander or a reflective expander can be used as long as they can expand the diameter of the light M that is linearly polarized light and has coherence.

As the transmissive expander, both of a magnification fixed type and a magnification variable type can be used. In addition, as the transmissive expander, a Kepler type beam expander, a Galileo type beam expander, or the like is suitably used.

The Kepler type beam expander is composed of two lenses having a positive focal length, and from the viewpoint of shaping a beam, it is preferable that a pinhole is provided between the two lenses.

In addition, it is preferable to use a beam shaper that also has a function of adjusting the light M having a Gaussian intensity distribution to a top hat intensity distribution.

In the beam combiner according to the embodiment of the present invention, the position of the beam expander element 70 is not limited to a position between the light source 52 and the beam splitter 54.

For example, the beam expander element 70 may be disposed on the optical paths of the first light M1 and the second light M2 between the beam splitter 54 and the beam combiner element 60. It is preferable that the magnification ratios of the beam expander elements 70 disposed on the optical paths of the first light M1 and the second light M2 are the same. Note that, in this case, the beam expander element 70 is disposed upstream of the light control element 58. This point is also applicable to a case where the light control element is provided on the optical path of the second light M2.

In addition, in the beam combiner according to the embodiment of the present invention, a plurality of the beam expander elements 70 may be disposed on one optical path. For example, the beam expander element 70 may be disposed upstream and downstream of the beam splitter 54.

In the example shown in FIG. 15, the optical path adjustment optical system 72 is provided between the light source 52 and the beam expander element 70. The optical path adjustment optical system 72 is an optical system that detects the light M emitted from the light source 52 and appropriately adjusts the optical path (optical axis) of the light M.

In the example shown in the drawing, the optical path adjustment optical system 72 includes actuated mirrors **74*a* and 74*b*, a mirror 76, and detectors 78*a* and 78*b***.

The actuated mirrors **74*a* and 74*b*** are well-known angle-variable mirrors where the angle can be adjusted by an actuator such as a piezoelectric element.

The detector **78*a* is a detector that detects an incidence position of the light M into the actuated mirror 74*a*. The detector 78*b* is a detector that detects an incidence position of the light M into the mirror 76**.

The mirror 76 is a well-known reflecting mirror.

During the exposure of the photosensitive material Z, the optical path adjustment optical system 72 detects the incidence position of the light M on the actuated mirror **74*a* using the detector 78*a* and detects the incidence position of the light M on the mirror 76 using the detector 78*b***.

Based on the detection results of the light M, the optical path adjustment optical system 72 adjusts the angles of the actuated mirrors **74*a* and 74*b* such that the optical path of the light M from the light source 52 to the beam expander element 70** is appropriate.

Not only in the beam combiner but also in various optical systems, the light source 52 varies over time such that the optical path of the light M also varies.

As a result, the incidence position of interference light into the photosensitive material Z deviates from a reference position such that the exposure position on the photosensitive material Z is different from a desired position. In addition, the variation in the optical path of the light M is the deviation in the incidence position and the angle of the light M into each of the optical elements. In a case where the deviation of the incidence position and the incidence angle into the optical element occurs, each of the optical elements cannot exhibit predetermined optical performance, and the exposure accuracy of the photosensitive material Z decreases.

On the other hand, as a preferable aspect, the beam combiner shown in FIG. 15 includes the optical path adjustment optical system 72 that adjusts the optical path of the light M. The beam combiner includes the optical path adjustment optical system 72 such that the optical path of the light M is at an appropriate position and the photosensitive material Z can be exposed. As a result, in the beam combiner, high-accuracy exposure can be performed at the desired position of the photosensitive material Z.

In the beam combiner according to the embodiment of the present invention, the optical path adjustment optical system is not limited to the configuration in the example shown in the drawing, and various well-known automatic adjustment units that adjust an optical path of a light beam used in various optical systems (optical devices) can be used.

A method of forming an alignment film according to the embodiment of the present invention comprises irradiating a coating film including a compound having a photo-aligned group with interference light generated by the beam combiner according to the embodiment of the present invention.

In the method of forming an alignment film according to the embodiment of the present invention, that is, in the method of forming an alignment film according to the embodiment of the present invention using the beam combiner according to the embodiment of the present invention, a coating film including a compound having a photo-aligned group can be irradiated with an alignment pattern (interference pattern) having a large size, that is, interference light.

Accordingly, in a method of manufacturing an optical element described below using the alignment film formed using the method of forming an alignment film according to the embodiment of the present invention, an optical element having a large size can be prepared.

Specifically, the diameter of the interference pattern is preferably 30 mm or more, more preferably 40 mm or more, and still more preferably 50 mm or more.

In a case where the alignment pattern to be formed is the concentric circular pattern shown in FIG. 2, as the diameter of the pattern increases, the single period Λ of the liquid crystal alignment pattern at an end portion of the pattern decreases. However, according to the present invention, a clear and fine interference pattern can be obtained.

Figure 5:
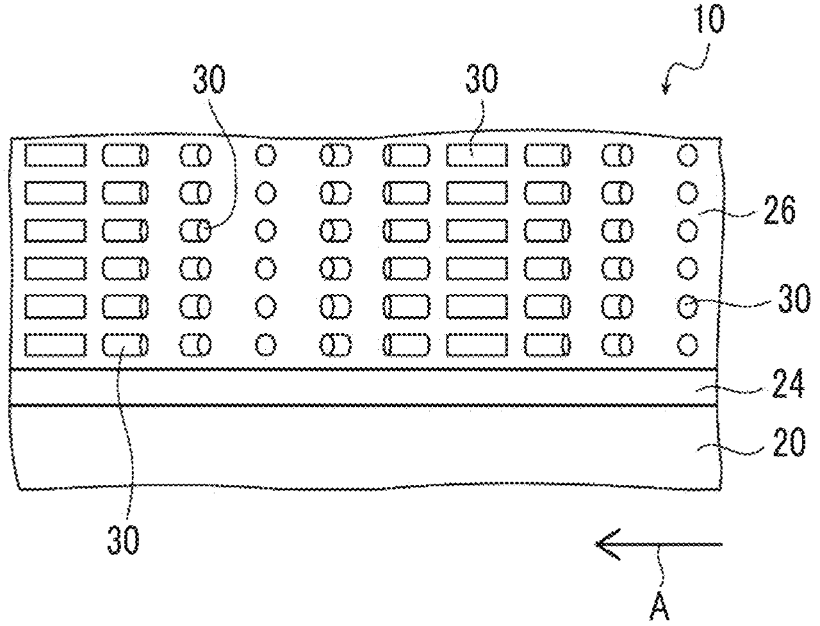
FIG. 5 is a schematic cross-sectional view showing an example of the optical element manufactured using the manufacturing method according to the present invention.

In the method of forming an alignment film according to the embodiment of the present invention, for example, as conceptually shown in FIG. 5, a method of forming an alignment film 24 consisting of a photo-alignment film on a support 20 can be used.

As the support 20, various sheet-shaped materials (films or plate-shaped materials) can be used as long as they can support the alignment film 24 and an optically-anisotropic layer 26 described below.

As the support 20, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

A coating film including a compound having a photo-aligned group is formed on a surface of the support 20, and this coating film is dried.

Next, the dried coating film is irradiated with interference light that is formed by the above-described beam combiner 50 (50A) according to the embodiment of the present invention and where the first light M1 and the second light M2 of circularly polarized light are combined. As a result, the interference pattern is formed on the coating film, and the alignment film 24 having the alignment pattern is formed.

For example, in a case where the light control element 58 is a convex lens as in the example shown in the drawing, as shown in FIG. 2, the alignment film 24 having the same alignment pattern as the interference pattern that includes the pattern where the short line (short straight line) changes while continuously rotating in one direction in a radial shape can be formed.

Preferable examples of the compound having a photo-aligned group that is, the photo-alignment material used in the photo-alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking ester, a cinnamate compound, or a chalcone compound is suitably used.

In the method of manufacturing an optical element according to the embodiment of the present invention, a composition including a liquid crystal compound is applied to the alignment film formed as described above and is dried, and the liquid crystal compound is optionally cured.

Figure 4:
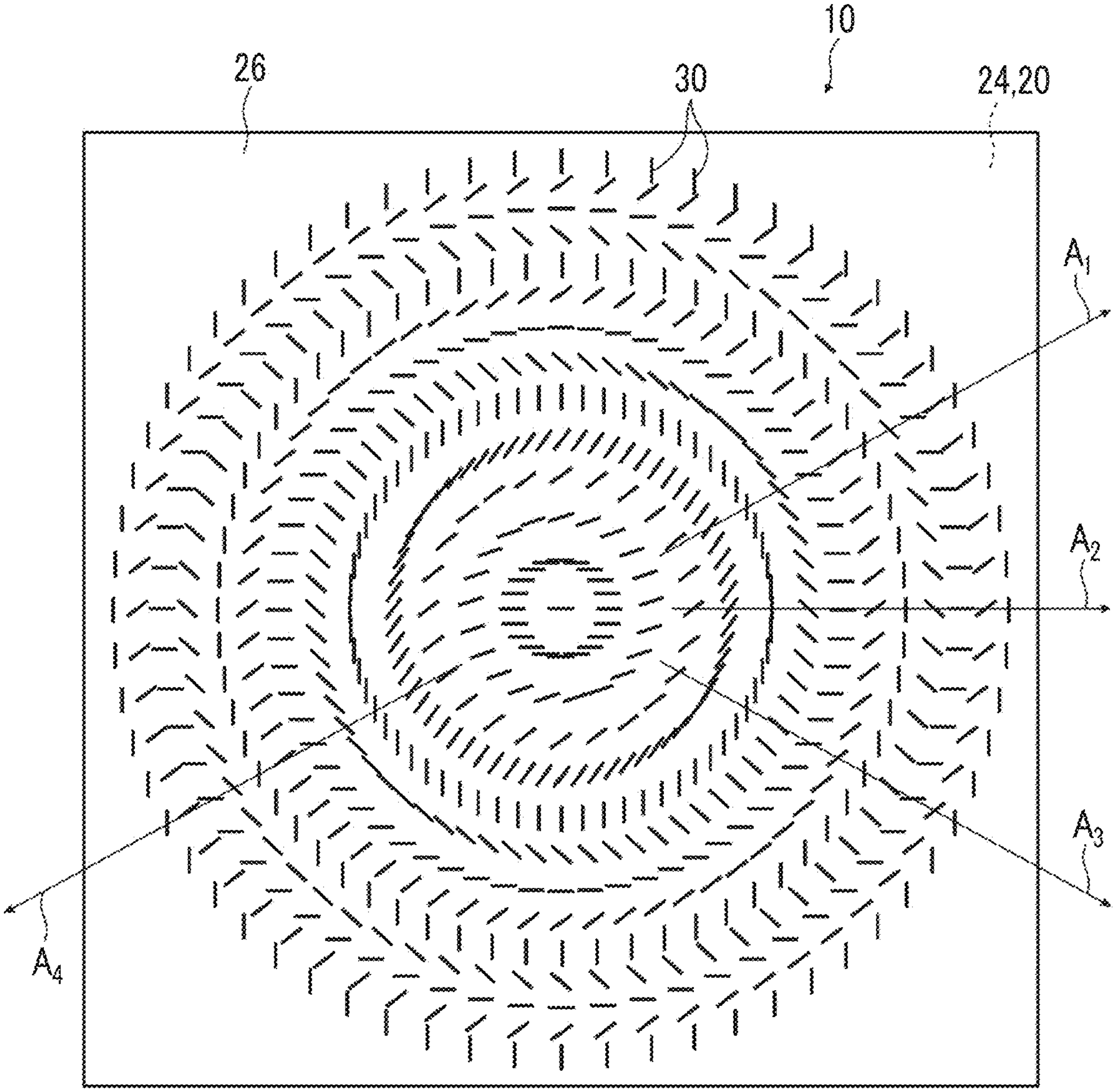
FIG. 4 is a schematic plan view showing an example of an optical element manufactured using a manufacturing method according to the present invention.

FIGS. 4 and 5 conceptually show an example of the optical element manufactured using the method of manufacturing an optical element according to the embodiment of the present invention. FIG. 4 is a plan view conceptually showing the optical element, and FIG. 5 is a cross-sectional view conceptually showing the optical element. The plan view is a view in a case where the optical element is seen from a thickness direction (laminating direction of the respective layers (films)).

As described above, the alignment film 24 is formed on the support 20. The optical element 10 shown in FIGS. 4 and 5 includes the optically-anisotropic layer 26 that is formed on the alignment film 24 using the composition including a liquid crystal compound.

For example, as described above, the alignment film 24 includes the interference pattern where the direction of the short line changes while continuously rotating in one direction in a radial shape from an inner side toward an outer side.

The optically-anisotropic layer 26 that is formed on the alignment film 24 using the composition including a liquid crystal compound includes a liquid crystal alignment pattern where a direction of an optical axis derived from a liquid crystal compound 30 changes while continuously rotating in one direction in a radial shape from an inner side toward an outer side. That is, the liquid crystal alignment pattern in the optically-anisotropic layer 26 shown in FIGS. 4 and 5 is a concentric circular pattern having a concentric circular shape where the one direction in which the direction of the optical axis derived from the liquid crystal compound 30 changes while continuously rotating moves from an inner side toward an outer side.

In FIGS. 4 to 8, for example, a rod-like liquid crystal compound is used as the liquid crystal compound 30. Therefore, the direction of the optical axis matches with a longitudinal direction of the liquid crystal compound 30.

In the optically-anisotropic layer 26, the direction of the optical axis of the liquid crystal compound 30 changes while continuously rotating in a plurality of directions from the center toward the outer side of the optically-anisotropic layer 26, for example, a direction indicated by an arrow $A_1$, a direction indicated by an arrow $A_2$, a direction indicated by an arrow $A_3$, a direction indicated by an arrow $A_4$, or . . . .

Accordingly, in the optically-anisotropic layer 26, the rotation direction of the optical axis of the liquid crystal compound 30 is the same as all the directions (one direction). In the example shown in the drawing, in all the directions including the direction indicated by the arrow $A_1$, the direction indicated by the arrow $A_2$, the direction indicated by the arrow $A_3$, and the direction indicated by the arrow $A_4$, the rotation direction of the optical axis of the liquid crystal compound 30 is counterclockwise.

That is, in a case where the arrow $A_1$ and the arrow $A_4$ are assumed as one straight line, the rotation direction of the optical axis of the liquid crystal compound 30 is reversed at the center of the optically-anisotropic layer 26 on the straight line. For example, the straight line formed by the arrow $A_1$ and the arrow $A_4$ is directed in the right direction (arrow $A_1$ direction) in the drawing. In this case, the optical axis of the liquid crystal compound 30 initially rotates clockwise from the outer side to the center of the optically-anisotropic layer 26, the rotation direction is reversed at the center of the optically-anisotropic layer 26, and then the optical axis of the liquid crystal compound 30 rotates counterclockwise from the center to the outer side of the optically-anisotropic layer 26.

In addition, in the optically-anisotropic layer 26 of the optical element 10, in the liquid crystal alignment pattern, in a case where a length over which the direction of the optical axis derived from the liquid crystal compound rotates by 180° in the one direction in which the direction of the optical axis derived from the liquid crystal compound 30 changes while continuously rotating is set as a single period, the length of the single period gradually decreases from an inner side toward an outer side.

In circularly polarized light incident into the optically-anisotropic layer 26 having the above-described liquid crystal alignment pattern, an absolute phase changes depending on individual local regions having different directions of optical axes of the liquid crystal compound 30. In this case, the amount of change in absolute phase in each of the local regions varies depending on the directions of the optical axes of the liquid crystal compound 30 into which circularly polarized light is incident.

In the optically-anisotropic layer (optical element 10) having the liquid crystal alignment pattern in which the direction of the optical axis of the liquid crystal compound 30 changes while continuously rotating in the one direction, a refraction direction of transmitted light depends on the rotation direction of the optical axis of the liquid crystal compound 30. That is, in this liquid crystal alignment pattern, in a case where the rotation direction of the optical axis of the liquid crystal compound 30 is reversed, the refraction direction of transmitted light is also reversed with respect to the one direction in which the optical axis rotates.

In addition, the diffraction angle of the optically-anisotropic layer 26 increases as the single period decreases. That is, the diffraction of light of the optically-anisotropic layer 26 increases as the single period decreases.

Accordingly, in the optically-anisotropic layer 26 having the concentric circular liquid crystal alignment pattern, that is, the liquid crystal alignment pattern in which the optical axis changes while continuously rotating in a radial shape, incidence light (light beam) can be diffused or be focused and transmitted depending on the rotation direction of the optical axis of the liquid crystal compound 30 and the turning direction of circularly polarized light to be incident.

The optically-anisotropic layer 26 is formed of a composition including a liquid crystal compound.

In FIG. 4 (and FIGS. 7 and 8 described below), in order to simplify the drawing and to clarify the configuration of the optical element 10, only the liquid crystal compound 30 (liquid crystal compound molecules) on the surface of the alignment film 24 in the optically-anisotropic layer 26 is shown. However, as conceptually shown in FIG. 5, the first optically-anisotropic layer 26 has a structure in which the aligned liquid crystal compounds 30 are laminated as in an optically-anisotropic layer that is formed using a composition including a typical liquid crystal compound.

In a case where an in-plane retardation value is set as λ/2, the optically-anisotropic layer 26 has a function of a general λ/2 plate, that is, a function of imparting a retardation of a half wavelength, that is, 180° to two linearly polarized light components in light incident into the optically-anisotropic layer and are orthogonal to each other. That is, the in-plane retardation is a retardation in the in-plane direction.

In a plane of the optically-anisotropic layer, the optically-anisotropic layer 26 includes the liquid crystal alignment pattern where the direction of the optical axis derived from the liquid crystal compound changes while continuously rotating in one direction (for example, directions of the arrow $A_1$ to the arrow $A_4$ in FIG. 4) in a radial shape from an inner side toward an outer side.

The optical axis 30A derived from the liquid crystal compound 30 is an axis having the highest refractive index in the liquid crystal compound 30, that is, a so-called slow axis. For example, in a case where the liquid crystal compound 30 is a rod-like liquid crystal compound, the optical axis 30A is along a rod-like major axis direction.

In the following description, the optical axis 30A derived from the liquid crystal compound 30 will also be referred to as "the optical axis 30A of the liquid crystal compound 30" or "the optical axis 30A".

Hereinafter, the optically-anisotropic layer 26 will be described an optically-anisotropic layer 26A that includes a liquid crystal alignment pattern where the optical axes 30A change while continuously rotating in one direction indicated by an arrow A as conceptually shown in a plan view of FIG. 6.

Figure 6:
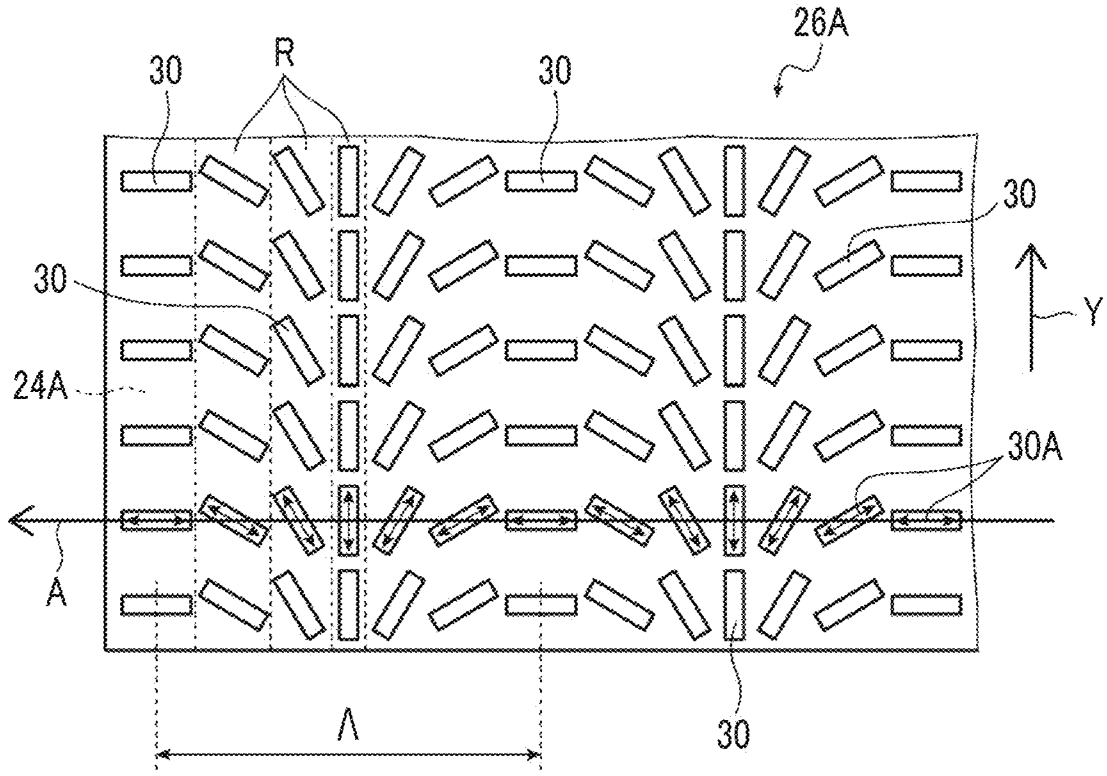
FIG. 6 is a conceptual diagram showing the optical element manufactured using the manufacturing method according to the present invention.

Even in the liquid crystal alignment pattern shown in FIG. 4 that includes one direction in which the optical axis changes while continuously rotating in a radial shape (concentric circular shape) from an inner side toward an outer side, the same optical effects as those of the liquid crystal alignment pattern shown in FIG. 6 can be exhibited for the one direction in which the optical axis changes while continuously rotating.

Figure 7:
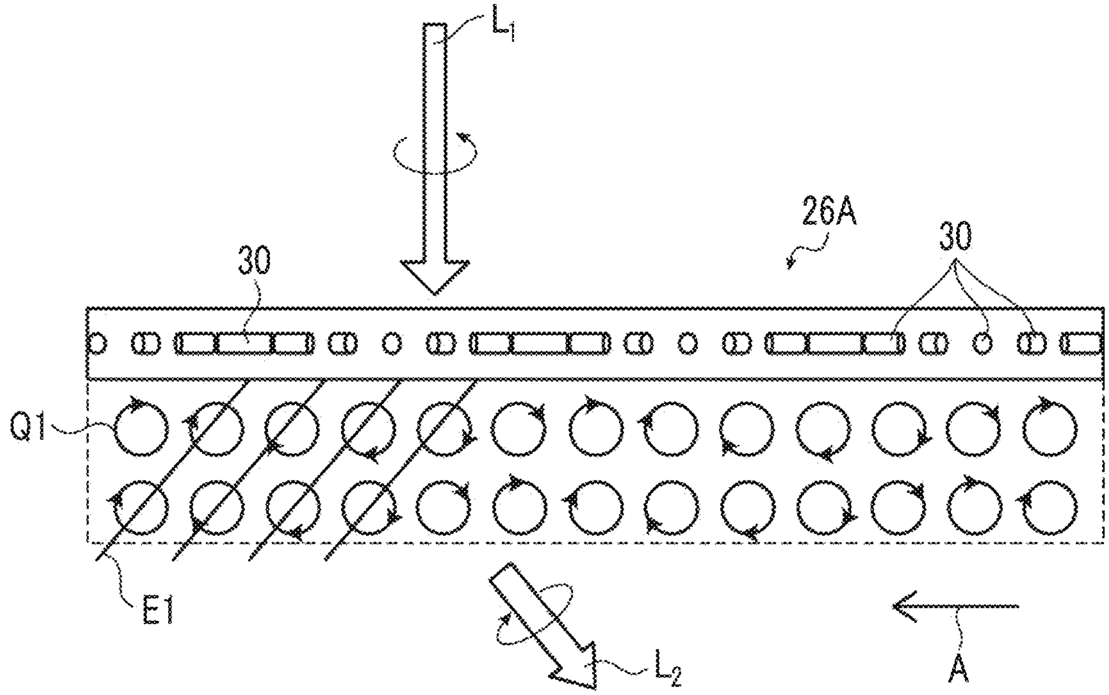
FIG. 7 is a conceptual diagram showing the optical element manufactured using the manufacturing method according to the present invention.
Figure 8:
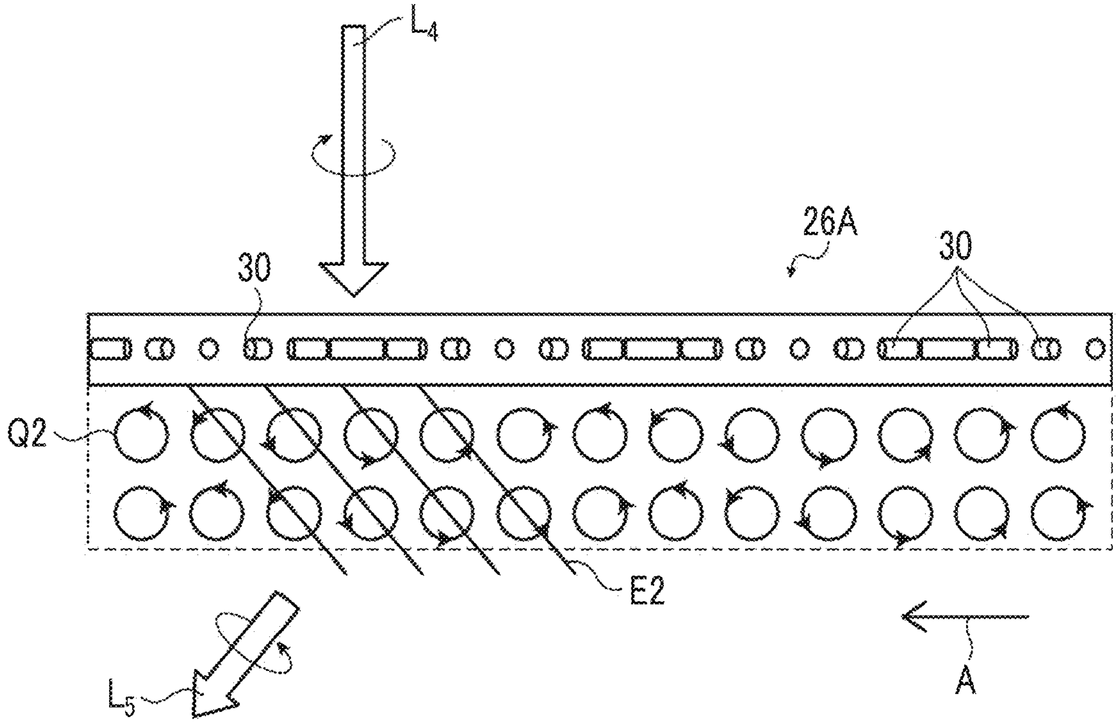
FIG. 8 is a conceptual diagram showing the optical element manufactured using the manufacturing method according to the present invention.

In the optically-anisotropic layer 26A, the liquid crystal compound 30 is two-dimensionally arranged in a plane parallel to the one direction indicated by the arrow A and a Y direction orthogonal to the arrow A direction. In FIGS. 7 and 8 described below, the Y direction is a direction orthogonal to the paper plane.

In the following description, "one direction indicated by the arrow A" will also be simply referred to as "arrow A direction".

In the optically-anisotropic layer 26 shown in FIG. 4, a circumferential direction of a concentric circle in the concentric circular liquid crystal alignment pattern corresponds to the Y direction in FIG. 6.

The optically-anisotropic layer 26A has the liquid crystal alignment pattern in which the direction of the optical axis 30A derived from the liquid crystal compound 30 changes while continuously rotating in the arrow A direction in a plane of the optically-anisotropic layer 26A.

Specifically, "the direction of the optical axis 30A of the liquid crystal compound 30 changes while continuously rotating in the arrow A direction (the predetermined one direction)" represents that an angle between the optical axis 30A of the liquid crystal compound 30, which is arranged in the arrow A direction, and the arrow A direction varies depending on positions in the arrow A direction, and the angle between the optical axis 30A and the arrow A direction sequentially changes from θ to θ+180° or θ−180° in the arrow A direction.

A difference between the angles of the optical axes 30A of the liquid crystal compound 30 adjacent to each other in the arrow A direction is preferably 45° or less, more preferably 15° or less, and still more preferably less than 15°.

On the other hand, regarding the liquid crystal compound 30 forming the optically-anisotropic layer 26A, the liquid crystal compounds 30 having the same direction of the optical axes 30A are arranged at regular intervals in the Y direction orthogonal to the arrow A direction, that is, the Y direction orthogonal to the one direction in which the optical axis continuously rotates.

In other words, regarding the liquid crystal compound 30 forming the optically-anisotropic layer 26, in the liquid crystal compounds 30 arranged in the Y direction, angles between the directions of the optical axes 30A and the arrow A direction are the same.

In the optically-anisotropic layer 26 shown in FIG. 4, a region where the directions of the optical axes 30A are the same is formed in an annular shape where the centers match with each other.

As in the above-described short line, even in the optically-anisotropic layer 26, in the liquid crystal alignment pattern in which the optical axis 30A continuously rotates in the one direction, a length (distance) over which the optical axis 30A of the liquid crystal compound 30 rotates by 180° is set as a length Λ of the single period in the liquid crystal alignment pattern.

That is, in the optically-anisotropic layer 26A shown in FIG. 6, the length (distance) over which the optical axis 30A of the liquid crystal compound 30 rotates by 180° in the arrow A direction in which the optical axis 30A changes while continuously rotating in a plane is set as the single period Λ in the liquid crystal alignment pattern. In other words, the single period Λ in the liquid crystal alignment pattern is defined by the distance between θ and θ+180° that is a range of the angle between the optical axis 30A of the liquid crystal compound 30 and the arrow A direction.

That is, a distance between centers of two liquid crystal compounds 30 in the arrow A direction is the single period Λ, the two liquid crystal compounds having the same angle in the arrow A direction. Specifically, as shown in FIG. 6, a distance of centers in the arrow A direction of two liquid crystal compounds 30 in which the arrow A direction and the direction of the optical axis 30A match with each other is the single period Λ.

In the optically-anisotropic layer 26A (optically-anisotropic layer 26), in the liquid crystal alignment pattern of the optically-anisotropic layer, the single period Λ is repeated in the arrow A direction, that is, in the one direction in which the direction of the optical axis 30A changes while continuously rotating.

In the optical element 10 having the liquid crystal alignment pattern where the optical axis 30A continuously rotates in a radial shape (concentric circular shape), the single period Λ in the optically-anisotropic layer 26 gradually decreases from an inner side (center) toward an outer side.

In the liquid crystal compounds arranged in the Y direction in the optically-anisotropic layer 26A, the angles between the optical axes 30A and the arrow A direction are the same. The arrow A direction is the one direction in which the direction of the optical axis of the liquid crystal compound 30 rotates. Regions where the liquid crystal compounds 30 in which the angles between the optical axes 30A and the arrow A direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction orthogonal to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In the optical element 10 having the liquid crystal alignment pattern where the optical axis 30A continuously rotates in the one direction in a radial shape, the region where the directions of the optical axes 30A are the same that is formed in an annular shape where the centers match with each other corresponds to the region R in FIG. 6. Regarding this point, the same can also be applied to the reflective optical element 10 including a cholesteric liquid crystal layer described below.

In a case where circularly polarized light is incident into the above-described optically-anisotropic layer 26A, the light is refracted such that the direction of the circularly polarized light is converted.

This action is conceptually shown in FIGS. 7 and 8. In the optically-anisotropic layer 26A, the value of the product of the difference in refractive index of the liquid crystal compound and the thickness of the optically-anisotropic layer is λ/2.

As described above, this action is also completely the same in the optical element 10 having the liquid crystal alignment pattern where the optical axis 30A continuously rotates in the one direction in a radial shape.

As shown in FIG. 7, in a case where the value of the product of the difference in refractive index of the liquid crystal compound in the optically-anisotropic layer 26 and the thickness of the optically-anisotropic layer is λ/2 and incidence light $L_1$ as left circularly polarized light is incident into the optically-anisotropic layer 26, the incidence light $L_1$ transmits through the optically-anisotropic layer 26A to be imparted with a retardation of 180°, and the transmitted light $L_2$ is converted into right circularly polarized light.

In addition, in a case where the incidence light $L_1$ transmits through the optically-anisotropic layer 26A, an absolute phase thereof changes depending on the direction of the optical axis 30A of each of the liquid crystal compounds 30. In this case, the direction of the optical axis 30A changes while rotating in the arrow A direction. Therefore, the amount of change in the absolute phase of the incidence light $L_1$ varies depending on the direction of the optical axis 30A. Further, the liquid crystal alignment pattern that is formed in the optically-anisotropic layer 26A is a pattern that is periodic in the arrow A direction. Therefore, as shown in FIG. 7, the incidence light $L_1$ transmitted through the optically-anisotropic layer 26 is imparted with an absolute phase Q1 that is periodic in the arrow A direction corresponding to the direction of each of the optical axes 30A. As a result, an equiphase surface E1 that is tilted in a direction opposite to the arrow A direction is formed.

Therefore, the transmitted light $L_2$ is refracted (diffracted) to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow A direction with respect to an incidence direction.

On the other hand, as conceptually shown in FIG. 8, in a case where the value of the product of the difference in refractive index of the liquid crystal compound in the optically-anisotropic layer 26A and the thickness of the optically-anisotropic layer is λ/2 and incidence light $L_4$ as right circularly polarized light is incident into the optically-anisotropic layer 26A, the incidence light $L_4$ transmits through the optically-anisotropic layer 26 to be imparted with a retardation of 180° and is converted into transmitted light $L_5$ of left circularly polarized light.

In addition, in a case where the incidence light $L_4$ transmits through the optically-anisotropic layer 26A, an absolute phase thereof changes depending on the direction of the optical axis 30A of each of the liquid crystal compounds 30. In this case, the direction of the optical axis 30A changes while rotating in the arrow A direction. Therefore, the amount of change in the absolute phase of the incidence light $L_4$ varies depending on the direction of the optical axis 30A. Further, the liquid crystal alignment pattern that is formed in the optically-anisotropic layer 26A is a pattern that is periodic in the arrow A direction. Therefore, as shown in FIG. 5, the incidence light $L_4$ transmitted through the optically-anisotropic layer 26 is imparted with an absolute phase Q2 that is periodic in the arrow A direction corresponding to the direction of each of the optical axes 30A.

Here, the incidence light $L_4$ is right circularly polarized light. Therefore, the absolute phase Q2 that is periodic in the arrow A direction corresponding to the direction of the optical axis 30A is opposite to the incidence light $L_1$ as left circularly polarized light. As a result, in the incidence light $L_4$, an equiphase surface E2 that is tilted in the arrow A direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow A direction with respect to an incidence direction.

In the optically-anisotropic layer 26, it is preferable that the in-plane retardation value of the plurality of regions R is a half wavelength. It is preferable that an in-plane retardation $Re(550)=\Delta n_{550}\times d$ of the plurality of regions R of the optically-anisotropic layer 26 with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer 26.

$$20\ \text{nm} \le \Delta n_{550} \times d \le 350\ \text{nm}. \quad (1)$$

The optically-anisotropic layer 26 functions as a so-called λ/2 plate. However, in the present invention, in a case where the support 20 and the alignment film 24 are provided, an aspect where a laminate integrally including the support 20 and the alignment film 24 functions as a λ/2 plate is included.

Here, by changing the single period Λ of the liquid crystal alignment pattern formed in the optically-anisotropic layer 26A, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow A direction, the refraction direction of transmitted light can be reversed.

As described above, in the optically-anisotropic layer 26 of the optical element 10, in the liquid crystal alignment pattern in which the optical axis 30A rotates in the one direction, the single period Λ of the liquid crystal alignment pattern gradually decreases from an inner side (center) toward an outer side.

Accordingly, depending on the wavelength, the polarization state, and the like of incident light, the rotation direction of the optical axis 30A from an inner side toward an outer side is set such that light is refracted from the center of the optical element 10, and the degree to which the length of the single period Λ of the liquid crystal alignment pattern gradually decreases is appropriately adjusted. As a result, the degree to which the light is focused toward the center (optical axis) of the optical element 10 can be adjusted.

That is, by increasing the degree to which the length of the single period Λ in the liquid crystal alignment pattern gradually decreases, the optical element 10 can act as a condenser lens (convex lens). In addition, by decreasing the degree to which the length of the single period Λ in the liquid crystal alignment pattern gradually decreases, the optical element 10 can act as a collimating lens.

The optically-anisotropic layer 26 is formed of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

By forming the alignment film 24 having the alignment pattern corresponding to the above-described liquid crystal alignment pattern on the support 20 and applying the liquid crystal composition to the alignment film 24, and curing the applied liquid crystal composition, the optically-anisotropic layer formed of the cured layer of the liquid crystal composition can be obtained.

In addition, the liquid crystal composition for forming the optically-anisotropic layer 26 includes a rod-like liquid crystal compound or a disk-like liquid crystal compound and may further include other components such as a leveling agent, an alignment control agent, a polymerization initiator, or an alignment assistant.

In addition, it is preferable that the optically-anisotropic layer 26 has a wide range for the wavelength of incidence light and is formed of a liquid crystal material having a reverse birefringence index dispersion. In addition, it is also preferable that the optically-anisotropic layer can be made to have a substantially wide range for the wavelength of incidence light by imparting a twist component to the liquid crystal composition or by laminating different retardation layers. For example, in the optically-anisotropic layer 26, a method of realizing a λ/2 plate having a wide-range pattern by laminating two liquid crystal layers having different twisted directions is disclosed in, for example, JP2014-089476A and can be preferably used in the present invention.

—Rod-Like Liquid Crystal Compound—

As the rod-like liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-like liquid crystal compound, not only the above-described low molecular weight liquid crystal molecules but also high molecular weight liquid crystal molecules can be used.

In the optically-anisotropic layer 26, it is more preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-64627. Further, as the rod-like liquid crystal compound, for example, compounds described in JP1999-513019A (JP-H11-513019A) and JP2007-279688A can also be preferably used.

—Disk-Like Liquid Crystal Compound—

As the disk-like liquid crystal compound, for example, compounds described in JP2007-108732A and JP2010-244038A can be preferably used.

In a case where the disk-like liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk plane, that is so-called, a fast axis.

The above-described optical element 10 is a transmissive optical element 10 through which circularly polarized light transmits and is diffracted. However, the optical element manufactured using the manufacturing method according to the embodiment of the present invention is not limited to this configuration.

That is, the optical element manufactured using the manufacturing method according to the embodiment of the present invention may be a reflective optical element including a cholesteric liquid crystal layer.

Figure 9:
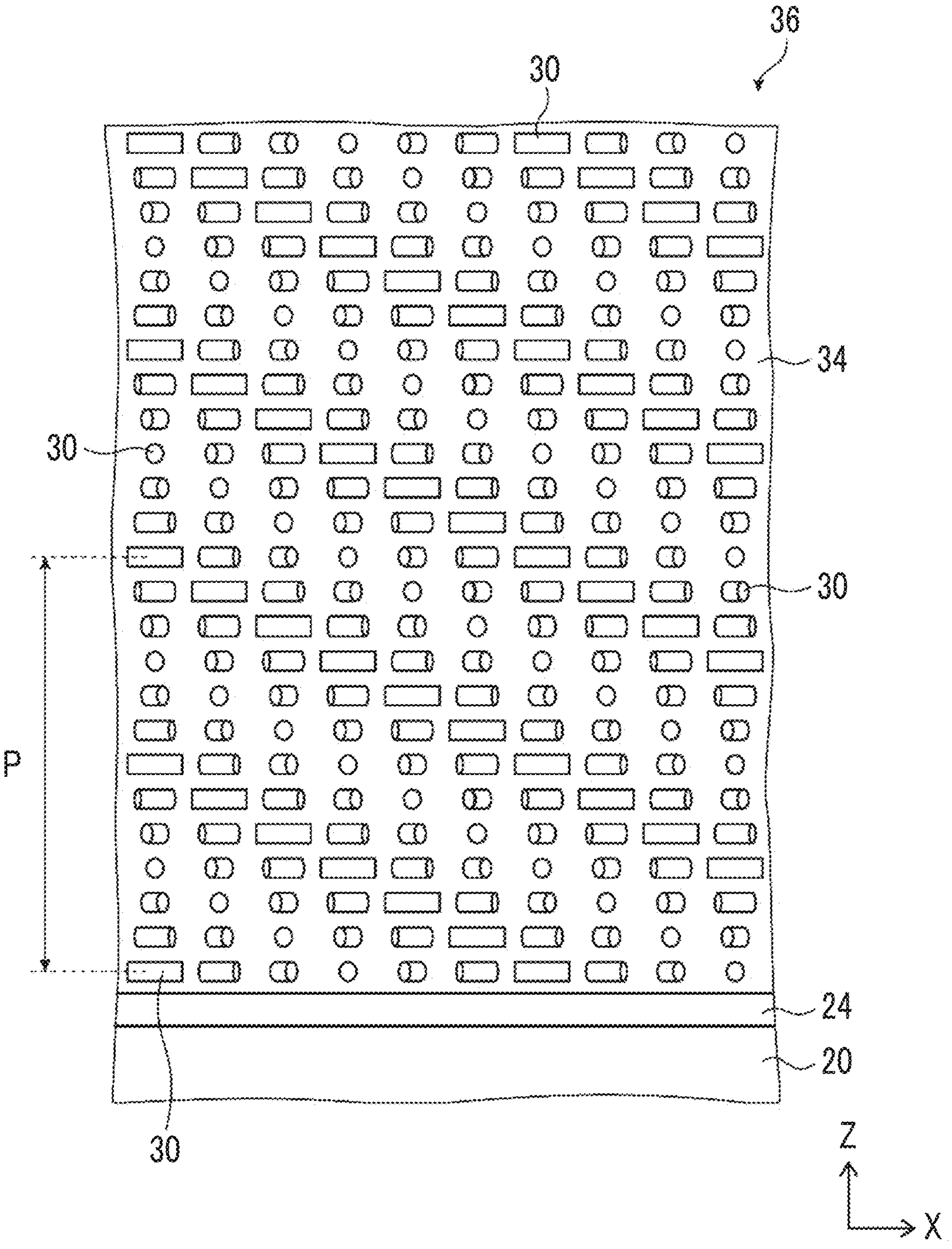
FIG. 9 is a schematic cross-sectional view showing another example of the optical element manufactured using the manufacturing method according to the present invention.

FIG. 9 conceptually shows an example of the reflective optical element manufactured using the manufacturing method according to the embodiment of the present invention. An optical element 36 shown in FIG. 9 includes a plurality of members that are the same as those in the above-described transmissive optical element 10 are used. Therefore, the same members are represented by the same reference numerals, and different portions will be mainly described below.

FIG. 9 is a diagram conceptually showing a layer configuration of the reflective optical element 36. The optical element 36 includes the support 20 and the alignment film 24 described above, and a cholesteric liquid crystal layer 34 that exhibits the action as the reflective optical element 36.

Regarding the liquid crystal alignment pattern of the liquid crystal compound 30 in the cholesteric liquid crystal layer 34, as in the optical element 10, as shown in FIG. 4, the liquid crystal alignment pattern in which the optical axis 30A changes while continuously rotating in the one direction indicated by the arrow A is provided in a radial shape.

Figure 10:
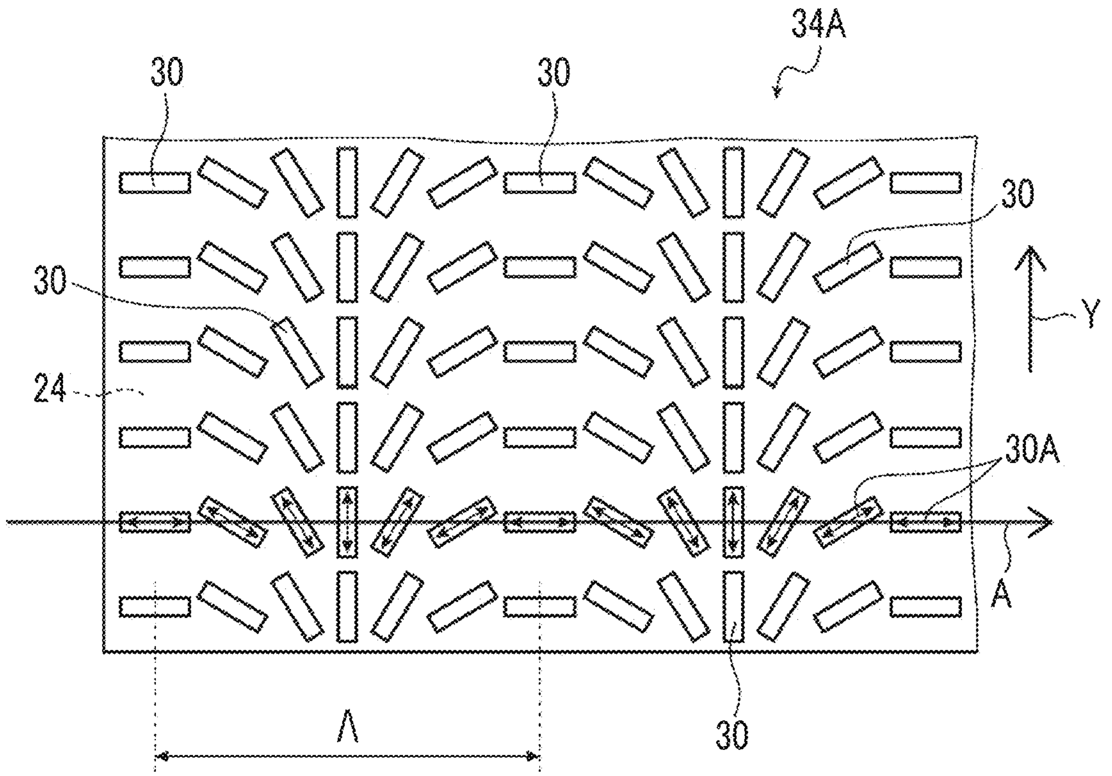
FIG. 10 is a conceptual diagram showing another example of the optical element manufactured using the manufacturing method according to the present invention.

FIG. 10 is a schematic diagram showing an alignment state of the liquid crystal compound 30 in a plane of a main surface of the cholesteric liquid crystal layer 34. FIG. 10 shows an alignment state of a surface of a cholesteric liquid crystal layer 34A facing the alignment film 24.

As in FIG. 6, in the cholesteric liquid crystal layer 34A shown in FIG. 10, in order to describe the cholesteric liquid crystal layer 34, the liquid crystal alignment pattern in which the optical axis 30A changes while continuously rotating in the one direction indicated by the arrow A is shown. However, even in the liquid crystal alignment pattern that includes one direction in which the optical axis changes while continuously rotating in a radial shape (concentric circular shape) from an inner side toward an outer side, the same optical effects as those of the liquid crystal alignment pattern shown in FIG. 10 can be exhibited for the one direction in which the optical axis changes while continuously rotating.

In addition, as in FIG. 6, even in FIG. 10, a circumferential direction of a concentric circle in the concentric circular liquid crystal alignment pattern shown in FIG. 4 corresponds to the Y direction in FIG. 10.

As shown in FIG. 9, the cholesteric liquid crystal layer 34 is a layer obtained by cholesteric alignment of the liquid crystal compound 30. In addition, FIGS. 9 and 10 show an example in which the liquid crystal compound forming the cholesteric liquid crystal layer is a rod-like liquid crystal compound.

In the following description, the cholesteric liquid crystal layer will also be referred to as “liquid crystal layer”.

In the optical element 36, the support 20 and the alignment film 24 are as described above.

In the optical element 36, the liquid crystal layer 34 (cholesteric liquid crystal layer) having the liquid crystal alignment pattern shown in FIG. 4 is provided on the alignment film 24 having the alignment pattern shown in FIG. 2.

The liquid crystal layer 34 is a cholesteric liquid crystal layer obtained by cholesterically aligning the liquid crystal compound to immobilize a cholesteric liquid crystalline phase. In the present example, the cholesteric liquid crystal layer has a liquid crystal alignment pattern in which a direction of an optical axis derived from a liquid crystal compound changes while continuously rotating in at least one in-plane direction.

As conceptually shown in FIG. 9, the liquid crystal layer 34 has a helical structure in which the liquid crystal compound 30 is helically turned and laminated as in a cholesteric liquid crystal layer obtained by immobilizing a typical cholesteric liquid crystalline phase. In the helical structure, a configuration in which the liquid crystal compound 30 is helically rotated once (rotated by 360°) and laminated is set as one helical pitch (helical pitch P), and plural pitches of the helically turned liquid crystal compound 30 are laminated.

As is well known, the cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and satisfies a relationship of “$\Delta\lambda = \Delta n \times$helical pitch”. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the liquid crystal layer 34, the selective reflection wavelength range of the liquid crystal layer 34 may be set, for example, by adjusting the helical pitch P of the liquid crystal layer 34 according to each of the liquid crystal diffraction elements.

As shown in FIG. 10, in the liquid crystal layer 34, the liquid crystal compounds 30 are arranged in the arrow A direction and the Y direction orthogonal to the arrow A direction. The direction of the optical axis 30A of the liquid crystal compound 30 changes while continuously rotating in the one in-plane direction in a plane, that is, in the arrow A direction. In addition, in the Y direction, the liquid crystal compounds 30 in which the directions of the optical axes 30A are the same are arranged at regular intervals.

“The direction of the optical axis 30A of the liquid crystal compound 30 changes while continuously rotating in the one in-plane direction” represents that as in the optically-anisotropic layer 26, angles between the optical axes 30A of the liquid crystal compounds 30 and the arrow A direction vary depending on positions in the arrow A direction and the angle between the optical axis 30A and the arrow A direction gradually changes from $\theta$ to $\theta+180°$ or $\theta-180°$ in the arrow A direction. That is, in each of the plurality of liquid crystal compounds 30 arranged in the arrow A direction, as shown in FIG. 10, the optical axis changes in the arrow A direction while rotating on a given angle basis.

A difference between the angles of the optical axes 30A of the liquid crystal compound 30 adjacent to each other in the arrow A direction is preferably 45° or less, more preferably 15° or less, and still more preferably less than 15°.

As in the above-described optically-anisotropic layer 26, even in the liquid crystal layer 34, in the liquid crystal alignment pattern of the liquid crystal compound 30, a length (distance) over which the optical axis 30A of the liquid crystal compound 30 rotates by 180° in the arrow A direction in which the optical axis 30A changes while continuously rotating in a plane is set as a length $\Lambda$ of the single period in the liquid crystal alignment pattern.

In the liquid crystal alignment pattern of the liquid crystal layer 34, the single period $\Lambda$ is repeated in the arrow A direction, that is, in the one direction in which the direction of the optical axis 30A changes while continuously rotating. The optical element 36 is a liquid crystal diffraction element, and the single period $\Lambda$ is the period (single period) of the diffraction structure as described above.

On the other hand, in the liquid crystal compound 30 forming the liquid crystal layer 34, the directions of the optical axes 30A are the same in the direction (in FIG. 10, the Y direction) orthogonal to the arrow A direction, that is, the Y direction orthogonal to the one direction in which the optical axis 30A continuously rotates. In the liquid crystal alignment pattern shown in FIG. 4, as described above, the Y direction is a circumferential direction of a concentric circle.

In other words, in the liquid crystal compound 30 forming the liquid crystal layer 34, angles between the optical axes 30A of the liquid crystal compound 30 and the arrow A direction (X direction) are the same in the Y direction.

Figure 11:
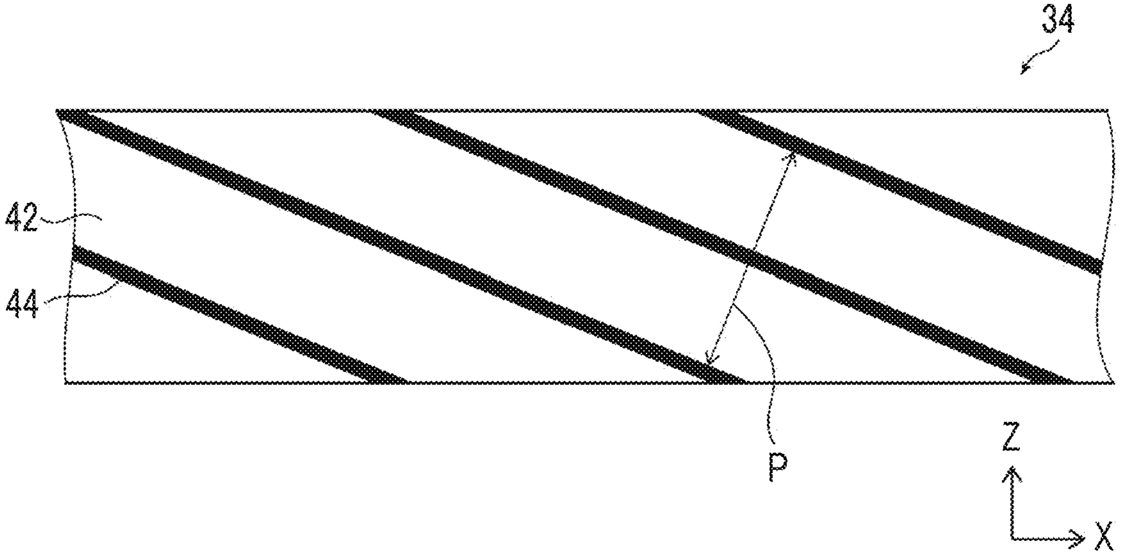
FIG. 11 is a conceptual diagram showing another example of the optical element manufactured using the manufacturing method according to the present invention.

In a case where a cross section of the liquid crystal layer 34 shown in FIG. 9 in the X-Z direction is observed with a scanning electron microscope (SEM), an arrangement direction in which bright portions 42 and dark portions 44 are alternately arranged as shown in FIG. 11, a stripe pattern tilted at a predetermined angle with respect to the main surface (X-Y plane) is observed.

Basically, the interval of the bright portions 42 and the dark portions 44 depends on the helical pitch P of the cholesteric liquid crystal layer.

Accordingly, the wavelength range of light that is selectively reflected by the cholesteric liquid crystal layer correlates to the interval of the bright portions 42 and the dark portions 44. That is, as the interval of the bright portions 42 and the dark portions 44 increases, the helical pitch P increases. Therefore, the wavelength range of light that is selectively reflected by the cholesteric liquid crystal layer increases. Conversely, as the interval of the bright portions 42 and the dark portions 44 decreases, the helical pitch P decreases. Therefore, the wavelength range of light that is selectively reflected by the cholesteric liquid crystal layer decreases.

In the cholesteric liquid crystal layer, basically, a structure in which the bright portion 42 and the dark portion 44 are repeated twice corresponds to the helical pitch P. Accordingly, in the cross section observed with a SEM, an interval between the bright portions 42 adjacent to each other or between the dark portions 44 adjacent to each other in a normal direction (vertical direction) of lines formed by the bright portions 42 or the dark portions 44 corresponds to a ½ pitch of the helical pitch P.

That is, the helical pitch P may be measured by setting the interval between the bright portions 42 or between the dark portions 44 in the normal direction with respect to the lines as a ½ pitch.

Hereinafter, an action of diffraction of the liquid crystal layer 34 will be described.

In a cholesteric liquid crystal layer of the related art, a helical axis derived from a cholesteric liquid crystalline phase is perpendicular to the main surface, and a reflecting surface thereof is parallel to the main surface. In addition, the optical axis of the liquid crystal compound is not tilted with respect to the main surface. In other words, the optical axis is parallel to the main surface. Accordingly, in a case where the X-Z plane of the cholesteric liquid crystal layer in the related art is observed with a SEM, an arrangement direction in which bright portions and dark portions are alternately arranged is perpendicular to the main surface.

The cholesteric liquid crystalline phase has specular reflectivity. Therefore, in a case where light is incident from the normal direction into the cholesteric liquid crystal layer, the light is reflected in the normal direction.

Figure 12:
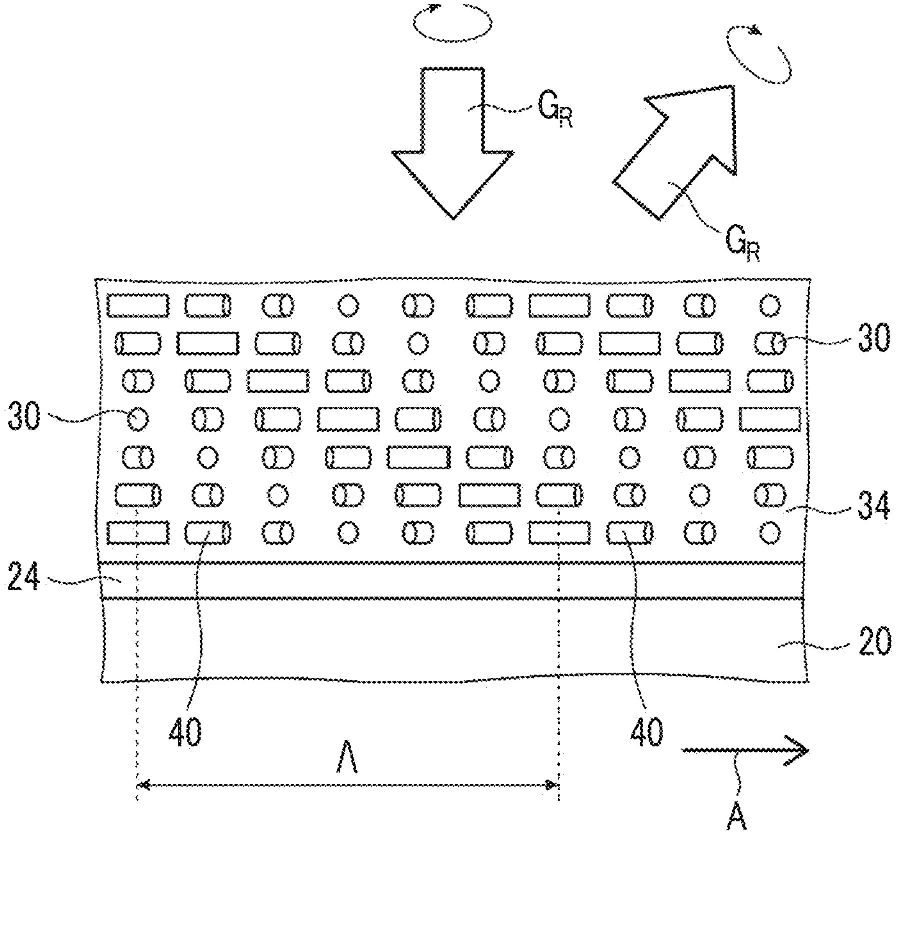
FIG. 12 is a conceptual diagram showing another example of the optical element manufactured using the manufacturing method according to the present invention.

On the other hand, the liquid crystal layer 34 reflects incident light in a state where the light is tilted in the arrow A direction with respect to the specular reflection. The liquid crystal layer 34 has the liquid crystal alignment pattern in which the optical axis 30A changes while continuously rotating in the arrow A direction (the predetermined one direction) in a plane. Hereinafter, the description will be made with reference to FIG. 12.

For example, it is assumed that the liquid crystal layer 34 is a cholesteric liquid crystal layer that selectively reflects right circularly polarized light $G_R$ of green light. Accordingly, in a case where light is incident into the liquid crystal layer 34, the liquid crystal layer 34 reflects only right circularly polarized light $G_R$ of green light and allows transmission of the other light.

Here, in the liquid crystal layer 34, the optical axis 30A of the liquid crystal compound 30 changes while rotating in the arrow A direction (the one direction).

The liquid crystal alignment pattern formed in the liquid crystal layer 34 is a pattern that is periodic in the arrow A direction. Therefore, as conceptually shown in FIG. 12, the right circularly polarized light $G_R$ of green light incident into the liquid crystal layer 34 is reflected (diffracted) in a direction corresponding to the period of the liquid crystal alignment pattern, and the reflected right circularly polarized light $G_R$ of green light is reflected (diffracted) in a direction tilted with respect to the XY plane (the main surface of the cholesteric liquid crystal layer) in the arrow A direction.

In addition, in a case where circularly polarized light having the same wavelength and the same turning direction is reflected, by reversing the rotation direction of the optical axis 30A of the liquid crystal compound 30 toward the arrow A direction, a reflection direction of the circularly polarized light can be reversed.

That is, in FIGS. 9 and 10, the rotation direction of the optical axis 30A toward the arrow A direction is clockwise, and one circularly polarized light is reflected in a state where the light is tilted in the arrow A direction. By setting the rotation direction of the optical axis 30A to be counterclockwise, the circularly polarized light is reflected in a state where the light is tilted in a direction opposite to the arrow A direction.

Further, in the liquid crystal layer having the same liquid crystal alignment pattern, the reflection direction is reversed by adjusting the helical turning direction of the liquid crystal compound 30, that is, the turning direction of circularly polarized light to be reflected.

For example, in a case where the helical turning direction of the liquid crystal layer is right-twisted, the liquid crystal layer selectively reflects right circularly polarized light, and has the liquid crystal alignment pattern in which the optical axis 30A rotates clockwise in the arrow A direction. As a result, the right circularly polarized light is reflected in a state where the light is tilted in the arrow A direction.

In addition, for example, in a case where the helical turning direction of the liquid crystal layer is left-twisted, the liquid crystal layer selectively reflects left circularly polarized light, and has the liquid crystal alignment pattern in which the optical axis 30A rotates clockwise in the arrow A direction. As a result, the left circularly polarized light is reflected in a state where the light is tilted in a direction opposite to the arrow A direction.

Accordingly, the optical element 36 can be used as a convex mirror that reflects incidence light to diffuse the light or a concave mirror that reflects incidence light to focus the light depending on the rotation direction of the optical axis 30A from an inner side toward an outer side in the liquid crystal layer 34 and the turning direction of circularly polarized light to be selectively reflected from the liquid crystal layer 34.

As described above, in the liquid crystal layer 34 that acts as the reflective optical element 36, in the liquid crystal alignment pattern of the liquid crystal compound 30, the single period Λ as the length over which the optical axis 30A of the liquid crystal compound 30 rotates by 180° is the period (single period) of the diffraction structure. In addition, in the liquid crystal layer 34, the one direction (arrow A direction) in which the optical axis 30A of the liquid crystal compound 30 changes while rotating is the periodic direction of the diffraction structure.

In the liquid crystal layer having the liquid crystal alignment pattern, as the single period Λ decreases, the diffraction angle of reflected light with respect to the incidence light increases. That is, as the single period Λ decreases, incidence light can be largely diffracted to be reflected in a direction that is largely different from specular reflection.

In the present invention, the single period Λ of the liquid crystal layer 34 is not particularly limited, and the single period Λ from which signal light 103 to be assumed can be separated may be appropriately set depending on the wavelength or the like of the signal light 103.

The single period Λ of the liquid crystal layer 34 is preferably 0.1 to 20 μm and more preferably 0.1 to 10 μm.

The liquid crystal layer 34 can be formed by immobilizing a liquid crystal phase in a layer shape, the liquid crystal phase obtained by aligning the liquid crystal compound 30 in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 30 in the liquid crystal layer does not necessarily exhibit liquid crystallinity. For example, the molecular weight of the polymerizable liquid crystal compound may be increased by a curing reaction such that the liquid crystallinity thereof is lost.

Regarding this point, the same can also be applied to the above-described optically-anisotropic layer 26.

Examples of a material used for forming the liquid crystal layer 34 include a liquid crystal composition including a liquid crystal compound. It is preferable that the liquid crystal compound is a polymerizable liquid crystal compound.

Examples of the liquid crystal composition for forming the (cholesteric) liquid crystal layer 34 include a liquid crystal composition obtained by adding a chiral agent for helically aligning the liquid crystal compound 30 to the liquid crystal composition for forming the optically-anisotropic layer 26 of the above-described transmissive optical element 36.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch P derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes a chiral carbon atom. However, an axially chiral compound or a planar chiral compound not having an chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

In a case where the liquid crystal layer 34 is formed, it is preferable that the liquid crystal layer 34 is formed by applying the liquid crystal composition to a surface where the liquid crystal layer 34 is to be formed, aligning the liquid crystal compound 30 to a state of a desired liquid crystalline phase, and curing the liquid crystal compound 30.

That is, in a case where the cholesteric liquid crystal layer is formed on the alignment film 24, it is preferable that the liquid crystal layer 34 obtained by immobilizing a cholesteric liquid crystalline phase is formed by applying the liquid crystal composition to the alignment film 24, aligning the liquid crystal compound 30 to a state of a cholesteric liquid crystalline phase, and curing the liquid crystal compound 30.

The applied liquid crystal composition is optionally dried and/or heated and then is cured to form the liquid crystal layer. In the drying and/or heating step, the liquid crystal compound 30 in the liquid crystal composition only has to be aligned to a cholesteric liquid crystalline phase. In the case of heating, the heating temperature is preferably 200° C. or lower and more preferably 130° C. or lower.

The aligned liquid crystal compound 30 is optionally further polymerized. Regarding the polymerization, thermal polymerization or photopolymerization using light irradiation may be performed, and photopolymerization is preferable. Regarding this point, the same can also be applied to the above-described optically-anisotropic layer 26.

Regarding the light irradiation, ultraviolet light is preferably used. The irradiation energy is preferably 20 $mJ/cm^2$ to 50 $J/cm^2$ and more preferably 50 to 1500 $mJ/cm^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer 34 is not particularly limited, and the thickness with which a required light reflectivity can be obtained may be appropriately set depending on the use of the diffraction element, the light reflectivity required for the liquid crystal layer 34, the material for forming the liquid crystal layer 34, and the like.

Hereinabove, the beam combiner, the method of forming an alignment film, and the method of manufacturing an optical element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention.

Accordingly, the scope of the present invention is not limited to the following specific examples.

A beam combiner having the configuration shown in FIG. 1 was prepared.

As the light source, a solid-state laser of a wavelength of 355 nm was used.

As the beam splitter, a polarization beam splitter (PBSW-20-350, manufactured by Sigmakoki Co., Ltd.) was used, and laser light was split such that the first light was P polarized light and the second light was S polarized light as in the beam combiner shown in FIG. 15.

As the optical element, a convex lens having a focal length of 90 mm was used.

As the beam combiner element, a cube type beam splitter was used.

Figure 16:
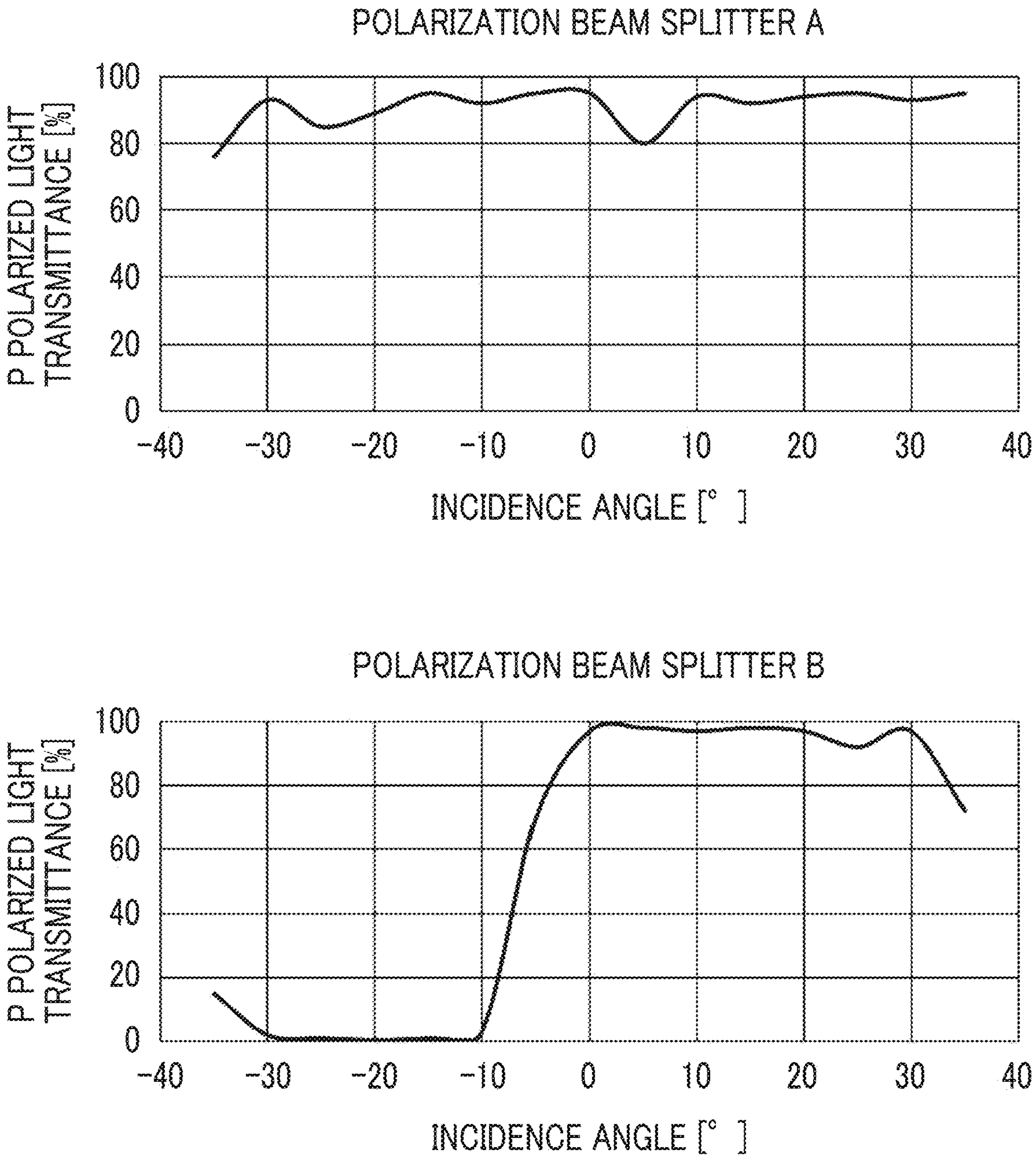
FIG. 16 is a diagram showing characteristics of a beam combiner used in Examples.

Specifically, as a beam splitter used as the beam combiner element in Comparative Example 1 and 2 and Examples 1 to 3 and 7, a polarization beam splitter A1 was used, in which as shown in the upper column of FIG. 16, a transmittance with respect to P polarized light was 70% or more in a case where an angle between an optical axis of the first light and incidence light in a plane orthogonal to the first surface (transmission surface) and parallel to an incidence direction of the second light (S polarized light) into the beam combiner element was in a range of −20° to 20° (refer to FIG. 14). The polarization beam splitter A1 has a cube shape having a size of 25 square mm.

In addition, as a beam splitter used as the beam combiner element in Examples 4 and 5, a polarization beam splitter A2 having the same transmission as the polarization beam splitter A1 and having a cube shape with a size of 75 square mm was used.

In the following description, in the plane, the angle between the optical axis of the first light and the incidence light will also be simply referred to as "incidence angle".

On the other hand, as a beam splitter used as the beam combiner element in Example 6, as shown in the lower column of FIG. 16, a polarization beam splitter B was used, in which in a case where an incidence angle was −10° or less, a transmittance of the first surface (transmission surface) with respect to P polarized light rapidly decreased. This polarization beam splitter has a cube shape with a size of 75 square mm as in the polarization beam splitter A2.

In the prepared beam combiner, as the polarization conversion layer, different layers were used in Comparative Example 1 and 2 and Examples 1 to 5. The same polarization conversion layer was used in Examples 4 and 6.

As the polarization conversion layer according to Comparative Example 1, a commercially available ¼ wave plate (WPQ-3550-4M, manufactured by Sigmakoki Co., Ltd.) was used. The ¼ wave plate was a zero-order wave plate where two quartz plates were bonded.

As the polarization conversion layer according to Comparative Example 2, an A-Plate (axial angle: 45°) having an in-plane retardation (Re) of 89 nm was used.

As the polarization conversion layer according to Example 1, a laminate including an A-Plate (axial angle: 45°) having an in-plane retardation (Re) of 89 nm as the first layer and a C-plate having a thickness direction retardation (Rth) of 33 nm as the second layer was used.

As the polarization conversion layer according to Example 2, a laminate including a C-plate having a thickness direction retardation (Rth) of 33 nm as the first layer and an A-Plate (axial angle: 45°) having an in-plane retardation (Re) of 89 nm as the second layer was used.

As the polarization conversion layers according to Examples 3 and 7, a laminate including an A-Plate (axial angle: 0°) having an in-plane retardation (Re) of 89 nm as the first layer, an A-Plate (axial angle: 45°) having an in-plane retardation (Re) of 89 nm as the second layer, and a C-plate having a thickness direction retardation (Rth) of 33 nm as the third layer was used.

As the polarization conversion layers according to Examples 4 and 6, a laminate including an A-Plate (axial angle: 0°) having an in-plane retardation (Re) of 89 nm as the first layer and an A-Plate (axial angle: 45°) having an in-plane retardation (Re) of 89 nm as the second layer was used.

As the polarization conversion layer according to Example 5, a laminate including an A-Plate (axial angle: 0°) having an in-plane retardation (Re) of 89 nm as the first layer and an A-Plate (axial angle: −45°) having an in-plane retardation (Re) of 89 nm as the second layer was used.

As the polarization conversion layers according to Examples 4 to 7, a polarization conversion layer having both surfaces interposed between glass substrates on which the antireflection layer was formed was used. The reflectivity of the antireflection layer having a wavelength of 355 nm with respect to P polarized light and S polarized light was 0.2% or less in an incidence angle range of ±30°.

The axial angle (slow axis angle) refers to the angle of the slow axis of the polarization conversion layer, was 0° in a case where the axial angle is parallel to S polarized light, and was 90° in a case where the axial angle is parallel to P polarized light.

In addition, in the polarization conversion layer, the first layer was the light incidence side.

[Evaluation of Ellipticity]

Regarding the beam combiner prepared as described above, an absolute value (requirement A) of the ellipticity of the first light emitted from the polarization conversion layer in a case where only the first light (linearly polarized light) was incident into the beam combiner element without the second light being incident thereinto and an absolute value (requirement B) of the ellipticity of the second light emitted from the polarization conversion layer in a case where only the second light (linearly polarized light) was incident into the beam combiner element without the first light being incident thereinto were measured as follows.

The λ/4 plate and the polarizer were disposed on the emission side of the polarization conversion layer. In this state, an optical system was prepared to measure the light intensity using a power meter in a case where the light transmitted through the polarization conversion layer transmitted through the λ/4 plate and the polarizer in this order.

In order to measure the measurement region a light screen having an opening of 1 mmφ was provided before the power meter. The polarizer and the power meter were disposed parallel to an angle at which the photosensitive material was provided, and the λ/4 plate was disposed perpendicular to the optical axis of the light transmitted through the polarization conversion layer.

Using this optical system, the ellipticity was calculated from a change in intensity of the transmitted light obtained by rotating the λ/4 plate and the polarizer. The evaluation is as follows.

A: the ellipticity was 0.92 or more.

B: the ellipticity was 0.8 or more and less than 0.92.

C: the ellipticity was 0.7 or more and less than 0.8.

D: the ellipticity was less than 0.7.

[Evaluation of Retardation of Polarization Conversion Layer During Oblique Incidence]

Regarding the polarization conversion layer of each of the beam combiners, a retardation during oblique incidence at 15° at the wavelength λ (λ=355 nm) was measured using a spectroscopic ellipsometer (M-2000, manufactured by J. A. Woollam Co., Inc.). The evaluation is as follows.

A: the retardation was in a range of 0.24λ to 0.26λ.

B: the retardation was outside of the range of 0.24λ to 0.26λ.

[Evaluation of Interference Pattern]

(Support)

A glass substrate was used as the support.

(Formation of Alignment Film)

The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

Material A for Photo-Alignment

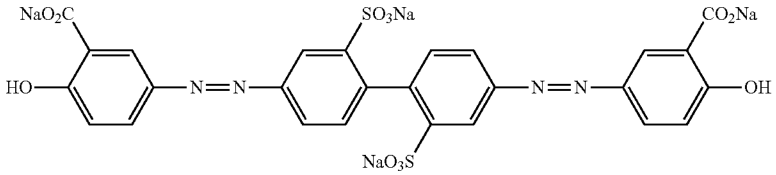

(Exposure of Alignment Film)

Using each of the beam combiners according to Comparative Examples 1 and 2 and Examples 1 to 3, the formed alignment film was exposed, and an alignment film P-1 having an alignment pattern including a pattern where a short straight line (short line) changed while continuously rotating in one direction in a radial shape was formed as shown in FIG. 2.

The single period Λ in the alignment pattern of the alignment film changed in a plane, and the minimum value thereof was 1 μm. The single period Λ of the alignment pattern was adjusted based on the focal length of a convex lens used as the optical element.

As the light source, a light source that emitted laser light having a wavelength of 355 nm as described above was used. The exposure amount of the interference light was 1000 mJ/$cm^2$.

(Formation of Optically-Anisotropic Layer for Pattern Observation)

As a liquid crystal composition forming an optically-anisotropic layer A-1, the following liquid crystal composition A-1 was prepared.

Liquid Crystal Composition A-1

| | |
|---|---|
| Liquid crystal compound L-1 | 100.00 parts by mass |
| Polymerization initiator (IRGACURE OXE01, manufactured by BASF SE) | 1.00 part by mass |
| Leveling agent T-1 | 0.08 parts by mass |
| Methyl ethyl ketone | 1050.00 parts by mass |

Liquid Crystal Compound L-1

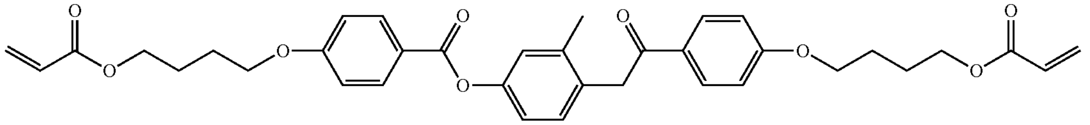

84%

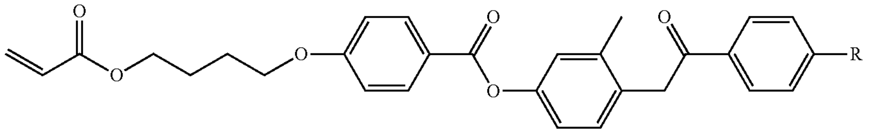

14%

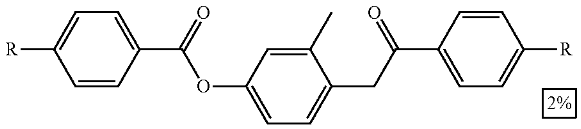

2%

-continued

R: 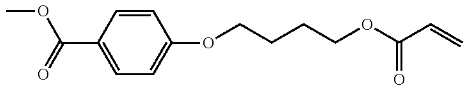

Leveling Agent T-1

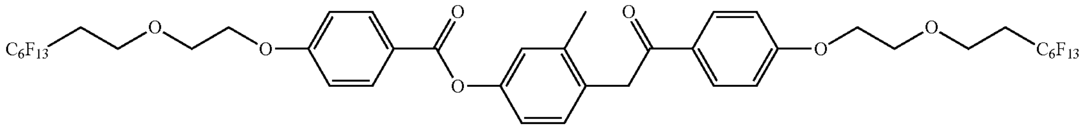

The liquid crystal composition A-1 was applied to the alignment film P-1 to form a coating film, and the coating film was heated using a hot plate at 80° C. Next, the coating film was irradiated with ultraviolet light having a wavelength of 365 nm at an irradiation dose of 300 mJ/$cm^2$ using a high pressure mercury lamp in a nitrogen atmosphere. As a result, the alignment of the liquid crystal compound was immobilized.

This way, an optical element for pattern observation where the alignment film P-1 and the optically-anisotropic layer A-1 were laminated in this order on the glass substrate was obtained.

(Pattern Observation 1)

The obtained optical element for pattern observation was rotated and observed below the polarizer where an absorption axis was disposed in a crossed nicols arrangement.

As a result, in the exposed portion of the optical element (the portion having the alignment pattern), the brightness was uniform without a change in brightness, and whether or not angle arrangement for light extinction was present was checked.

This implies that, on average in a plane, uniform optical characteristics are exhibited irrespective of the angle relationship with the absorption axis of the polarizing plate in the crossed nicols arrangement, and the alignment pattern where the alignment axis rotates is formed.

(Pattern Observation 2)

In addition, in a case where the obtained optical element for pattern observation was observed in a crossed nicols arrangement of an optical microscope, a clear alignment pattern where dark portions and bright portions alternately appeared was able to be verified.

Based on the pattern observation 1 and the pattern observation 2, the interference pattern was evaluated.

The evaluation is as follows.

- A: a clear alignment pattern where bright portions and dark portions alternately appeared was able to be verified irrespective of the installation direction of the sample, and the line width between a bright portion and a dark portion adjacent to each other was substantially regular.
- B: a clear alignment pattern where dark portions and bright portions alternately appeared was able to be verified, but the line width between a bright portion and a dark portion adjacent to each other varied depending on the installation direction of the sample.
- C: the alignment pattern was unclear depending on the installation direction of the sample.

The results are shown in the following table.

In addition, the table also shows the size (diameter) of the obtained alignment pattern.

| | Polarization Conversion Layer | | | | | | | | | | | |
|---|---|---|---|---|---|---|---|---|---|---|---|---|
| | First Layer | | | | Second Layer | | | | Third Layer | | | |
| | | Retardation | | Axial | | Retardation | | Axial | | Retardation | | Axial |
| | Kind | Re | Rth | Angle | Kind | Re | Rth | Angle | Kind | Re | Rth | Angle |
| Comparative Example 1 | — | 89 nm | — | 45° | | | — | | | | — | |
| Comparative Example 2 | A | 89 nm | — | 45° | | | — | | | | — | |
| Example 1 | A | 89 nm | — | 45° | C | — | 33 nm | None | | | — | |
| Example 2 | C | — | 33 nm | None | A | 89 nm | — | 45° | | | — | |
| Example 3 | A | 89 nm | — | 0° | A | 89 nm | — | 45° | C | — | 33 nm | None |
| Example 4 | A | 89 nm | — | 0° | A | 89 nm | — | 45° | | | — | |
| Example 5 | A | 89 nm | — | 0° | A | 89 nm | — | −45° | | | — | |
| Example 6 | A | 89 nm | — | 0° | A | 89 nm | | 45° | | | — | |
| Example 7 | A | 89 nm | — | 0° | A | 89 nm | | 45° | C | — | 33 nm | None |

| | Evaluation | | | | | |
|---|---|---|---|---|---|---|
| | Beam | Ellipticity | | | | |
| | Combiner Element | Requirement A | Requirement B | Retardation | Pattern | Size |
| Comparative Example 1 | A | D | A | B | D | 15 mm |
| Comparative Example 2 | A | D | A | B | B | 15 mm |

-continued

| | | | | | | |
|---|---|---|---|---|---|---|
| Example 1 | A | C | A | A | A | 15 mm |
| Example 2 | A | C | A | A | A | 15 mm |
| Example 3 | A | B | A | A | A | 15 mm |
| Example 4 | A | B | A | A | A | 50 mm |
| Example 5 | A | B | A | A | A | 50 mm |
| Example 6 | B | B | A | A | A | 50 mm |
| Example 7 | A | B | A | A | A | 15 mm |

In the column "Kind" of the table, A represents an A-plate, C represents a C-plate
The retardation in the evaluation represents the evaluation result of the retardation of the polarization conversion layer during oblique incidence
The pattern in the evaluation represents the evaluation of the interference pattern.

As shown in the above-described table, with the beam combiner according to the embodiment of the present invention where the ellipticity of light emitted from the polarization conversion layer is 0.7 or more in a case where only the first light or only the second light is incident into the beam combiner element, a fine interference pattern can be clearly formed.

Further, Examples 4 and 6 are examples where the same polarization conversion layer was used, and a clear alignment pattern was obtained.

However, in the optical element according to Example 6 where the polarization beam splitter B including the first surface (transmission surface) where the transmittance with respect to P polarized light rapidly decreased at an incidence angle of −10° or less was used as the beam combiner element, a region where an appropriate liquid crystal alignment pattern was formed was narrower than that in the optical element according to Example 4 where the polarization beam splitter A including the first surface where the transmittance with respect to P polarized light 70% or more in an incidence angle range of −20° to 20° was used as the beam combiner element.

In addition, in Example 7 where the antireflection layer was provided in the polarization conversion layer, as compared to Example 3 where the antireflection layer was not provided in the same polarization conversion layer, by providing the antireflection layer in the polarization conversion layer, light loss on the surface was reduced, and exposure within a short period of time can be performed.

Further, as described above, in the concentric circular alignment pattern shown in FIG. 2, as the diameter expands, the single period Λ of the alignment pattern at an end portion decreases. On the other hand, according to the present invention, even in a case where the diameter of the alignment pattern is 50 mm, a clear and high-quality alignment pattern (interference pattern) where the line width between a bright portion and a dark portion adjacent to each other is substantially regular can be formed.

As can be seen from the above results, the effects of the present invention are obvious.

EXPLANATION OF REFERENCES

10, 36: optical element
20: support
24: alignment film
26, 26A: optically-anisotropic layer
30: liquid crystal compound
31A: optical axis
34, 34A: (cholesteric) liquid crystal layer
50, 50A: beam combiner
52: light source
54: beam splitter
56*a*, 56*b*: mirror
58: light control element
60: beam combiner element
60*a*: first surface
60*b*: second surface
62, 62A: polarization conversion layer
100: beam combiner
102: light source
104: polarization beam splitter
106*a*, 106*b*: mirror
108: light control element
110: half mirror
112: λ/4 plate
Ax: optical axis
M: light having coherence
M1: first light
M2: second light
Z: photosensitive material

What is claimed is:

1. A beam combiner comprising:

a beam combiner element that includes a first surface through which at least a part of incidence light transmits and a second surface from which at least a part of the incidence light is reflected and emits light where the light transmitted through the first surface and the light reflected from the second surface are combined;

at least one light control element that focuses or diffuses light and is provided on at least one of an optical path of first light incident into the first surface of the beam combiner element or an optical path of second light incident into the second surface of the beam combiner element; and at least one polarization conversion layer that converts polarized light of the light emitted from the beam combiner element, wherein in a case where first linearly polarized light is incident into the first surface of the beam combiner element and light is not incident into the second surface of the beam combiner element, an absolute value of an ellipticity of light emitted from the polarization conversion layer is 0.7 or more, in a case where second linearly polarized light orthogonal to the first linearly polarized light is incident into the second surface of the beam combiner element and light is not incident into the first surface of the beam combiner element, an absolute value of an ellipticity of light emitted from the polarization conversion layer is 0.7 or more and a sign of the ellipticity is opposite to that of the light during the incidence of the first linearly polarized light, and wherein a wavelength of the first light and the second light is λ nm, the polarization conversion layer is a laminated wave plate that includes two A-Plates having different axial angles, and both retardations of the two A-Plates are 0.24λ to 0.26λ.

2. The beam combiner according to claim 1, wherein in a case where parallel light is incident into the light control element, at least a part of the light emitted from the beam combiner element has an angle of 15° or more with respect to an optical axis.

3. The beam combiner according to claim 2, wherein a wavelength of the first light and the second light is λ nm, the polarization conversion layer is a laminated wave plate that includes two A-Plates having different axial angles, and an absolute value of an angle between slow axes of the two A-Plates is 45°.

4. The beam combiner according to claim 2, wherein a wavelength of the first light and the second light is λ nm, and in a case where light having the wavelength λ nm is incident obliquely at 15°, a retardation of the polarization conversion layer is 0.24λ to 0.26λ.

5. The beam combiner according to claim 2, wherein in the first surface of the beam combiner element, a transmittance with respect to P polarized light having a wavelength λ nm is 70% or more in a case where an angle with respect to an optical axis of the first light in a plane orthogonal to the first surface and parallel to an incidence direction of the second light into the beam combiner element is in a range of −20° to 20°.

6. A method of forming an alignment film comprising:

irradiating a coating film including a compound having a photo-aligned group with light emitted from the beam combiner according to claim 2.

7. A method of manufacturing an optical element comprising:

a step of applying a composition including a liquid crystal compound to the alignment film formed using the method of forming an alignment film according to claim 6 and drying the applied composition.

8. The beam combiner according to claim 1, wherein a wavelength of the first light and the second light is λ nm, the polarization conversion layer is a laminated wave plate that includes two A-Plates having different axial angles, and an absolute value of an angle between slow axes of the two A-Plates is 45°.

9. The beam combiner according to claim 8, wherein a wavelength of the first light and the second light is λ nm, and in a case where light having the wavelength λ nm is incident obliquely at 15°, a retardation of the polarization conversion layer is 0.24λ to 0.26λ.

10. The beam combiner according to claim 8, wherein in the first surface of the beam combiner element, a transmittance with respect to P polarized light having a wavelength λ nm is 70% or more in a case where an angle with respect to an optical axis of the first light in a plane orthogonal to the first surface and parallel to an incidence direction of the second light into the beam combiner element is in a range of −20° to 20°.

11. A method of forming an alignment film comprising:

irradiating a coating film including a compound having a photo-aligned group with light emitted from the beam combiner according to claim 8.

12. A method of manufacturing an optical element comprising:

a step of applying a composition including a liquid crystal compound to the alignment film formed using the method of forming an alignment film according to claim 11 and drying the applied composition.

13. The beam combiner according to claim 1, wherein a wavelength of the first light and the second light is λ nm, and in a case where light having the wavelength λ nm is incident obliquely at 15°, a retardation of the polarization conversion layer is 0.24λ to 0.26λ.

14. The beam combiner according to claim 1, wherein in the first surface of the beam combiner element, a transmittance with respect to P polarized light having a wavelength λ nm is 70% or more in a case where an angle with respect to an optical axis of the first light in a plane orthogonal to the first surface and parallel to an incidence direction of the second light into the beam combiner element is in a range of −20° to 20°.

15. A method of forming an alignment film comprising:

irradiating a coating film including a compound having a photo-aligned group with light emitted from the beam combiner according to claim 1.

16. A method of manufacturing an optical element comprising:

a step of applying a composition including a liquid crystal compound to the alignment film formed using the method of forming an alignment film according to claim 15 and drying the applied composition.

* * * * *